United States Patent
Dulman

(10) Patent No.: US 6,999,181 B2
(45) Date of Patent: Feb. 14, 2006

(54) ADVANCED SIGNAL PROCESSING TECHNIQUE FOR TRANSLATING FRINGE LINE DISTURBANCES INTO SAMPLE HEIGHT AT A PARTICULAR POSITION ABOVE AN INTERFEROMETER'S SAMPLE STAGE

(75) Inventor: Lev Dulman, Napa, CA (US)

(73) Assignee: Angstrovision, Inc., Napa, CA (US)

( * ) Notice: Subject to any disclaimer, the term of this patent is extended or adjusted under 35 U.S.C. 154(b) by 253 days.

(21) Appl. No.: 10/215,905

(22) Filed: Aug. 9, 2002

(65) Prior Publication Data

US 2004/0027584 A1 Feb. 12, 2004

(51) Int. Cl.
*G01B 9/02* (2006.01)

(52) U.S. Cl. ...................................... 356/512
(58) Field of Classification Search ................ 256/511, 256/512, 513, 514, 516, 489, 495, 515
See application file for complete search history.

(56) References Cited

U.S. PATENT DOCUMENTS

| | | | |
|---|---|---|---|
| 3,612,693 A | 10/1971 | Stetson | |
| 4,188,122 A | 2/1980 | Massie et al. | |
| 4,340,306 A * | 7/1982 | Balasubramanian | ........ 356/513 |
| 4,815,856 A | 3/1989 | Bruce | |
| 4,832,489 A | 5/1989 | Wyant et al. | |
| 4,957,367 A * | 9/1990 | Dulman | ...................... 356/512 |
| 5,243,542 A | 9/1993 | Noguchi | |
| 5,432,606 A | 7/1995 | Noguchi et al. | |
| 5,452,953 A | 9/1995 | Ledger | |
| 5,523,842 A * | 6/1996 | Yasuda et al. | .............. 356/512 |
| 5,889,592 A | 3/1999 | Zawaideh | |
| 5,969,815 A | 10/1999 | Toida et al. | |
| 5,987,189 A * | 11/1999 | Schmucker et al. | ........ 382/284 |
| 5,999,262 A | 12/1999 | Dobschal et al. | |
| 6,147,764 A * | 11/2000 | Handa | ........................ 356/512 |
| 6,288,782 B1 | 9/2001 | Worster et al. | |
| 6,344,898 B1 * | 2/2002 | Gemma et al. | ............. 356/513 |
| 6,493,093 B2 * | 12/2002 | Harasaki et al. | ............ 356/497 |
| 6,731,391 B1 * | 5/2004 | Kao et al. | .................... 356/605 |
| 2003/0112446 A1 | 6/2003 | Miller | |

FOREIGN PATENT DOCUMENTS

WO WO 00/49364 8/2000

* cited by examiner

*Primary Examiner*—Samuel A. Turner
*Assistant Examiner*—Michael A. Lyons
(74) *Attorney, Agent, or Firm*—Blakely, Sokoloff, Taylor & Zafman, LLP

(57) ABSTRACT

A method is described that involves tracking a fringe line disturbance that has breached its field of reference. The method also involves translating each pixel location of the tracked fringe line disturbance to an $x, y, z_s$ data point. $x$ and $y$ represent a position on the plane of an interferometer's sample stage. $z_s$ represents the height of a sample above the $x, y$ position. The sample is placed upon the sample stage of an inteferometer so as to create the fringe line disturbance. The fringe line disturbance is observed on the interferometer's detector.

18 Claims, 25 Drawing Sheets

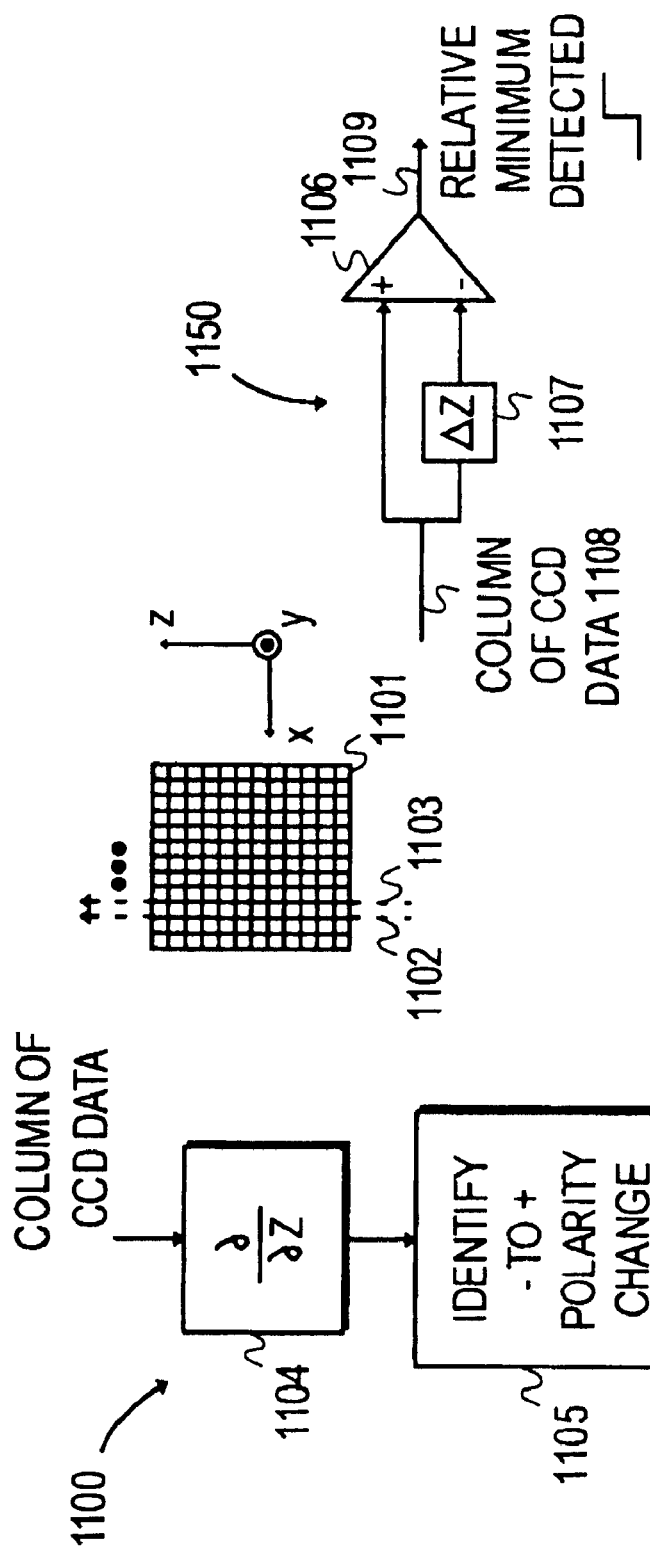

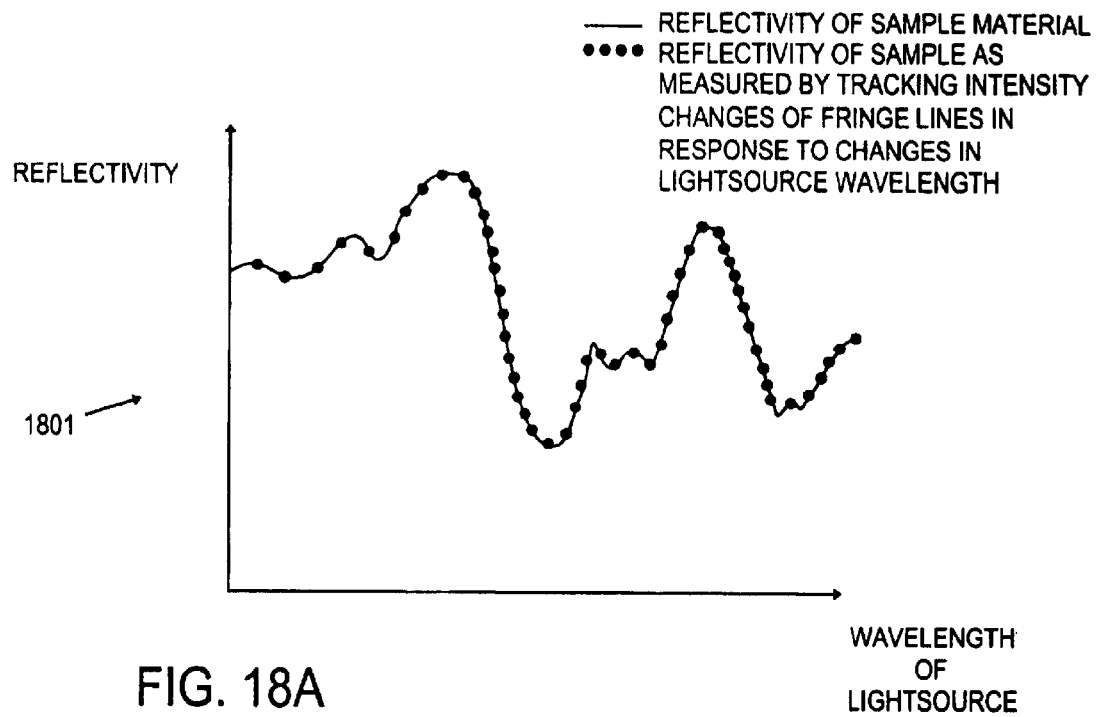
FIG. 18A
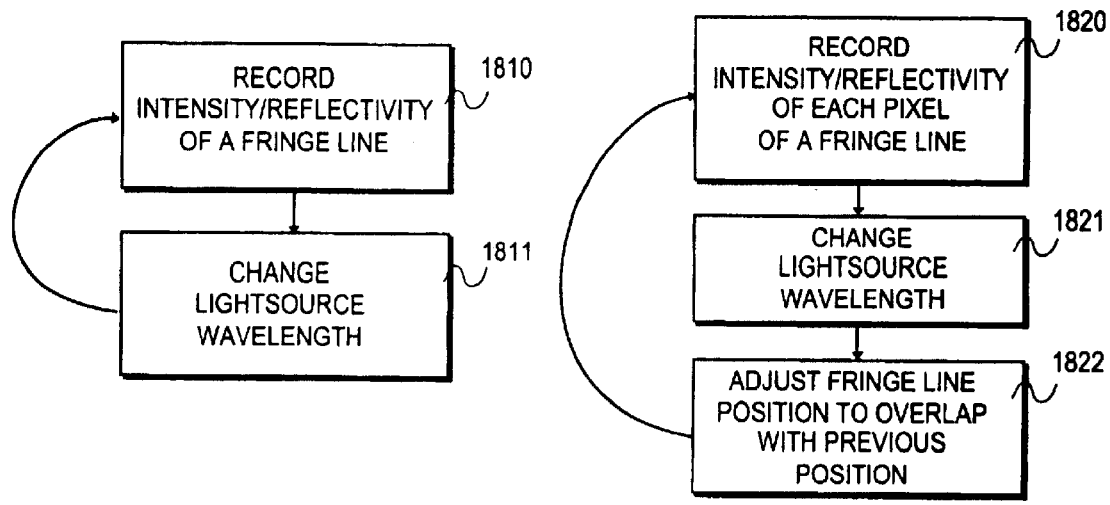
FIG. 18B
FIG. 18C

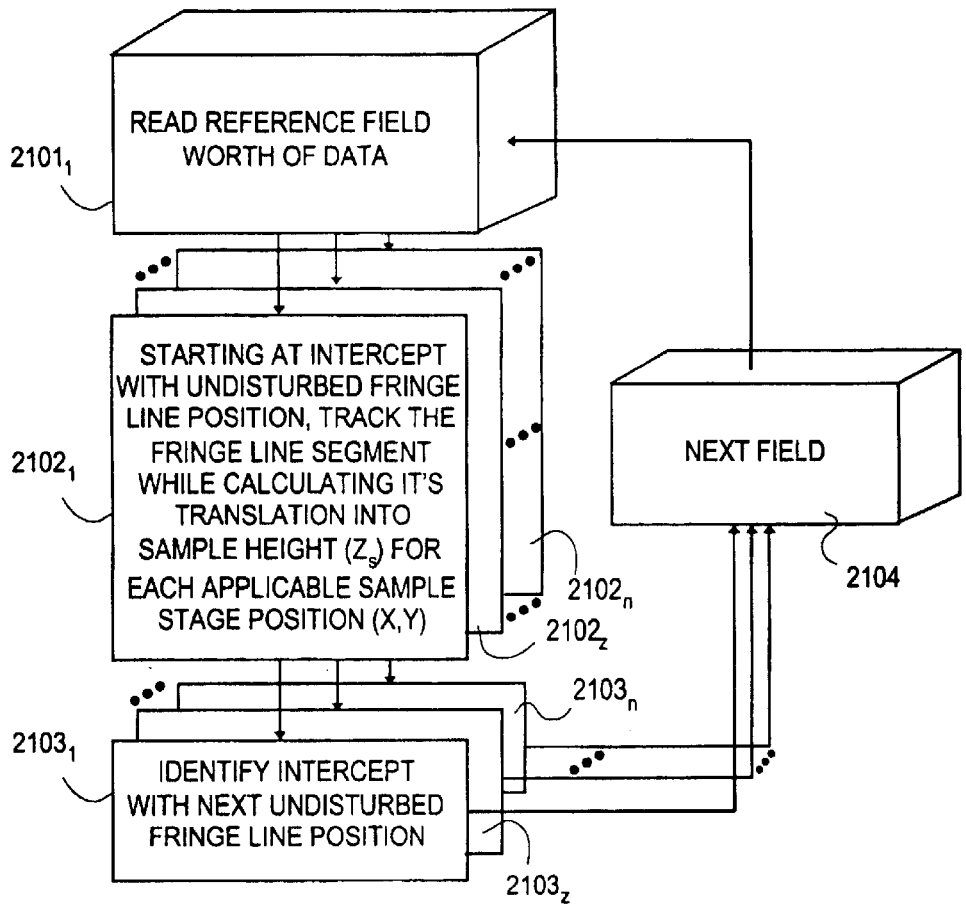
FIG. 21A
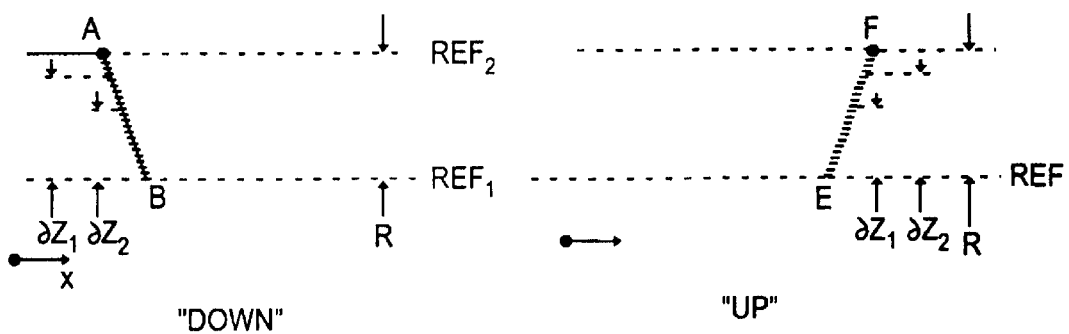
FIG. 21B
FIG. 21C

ADVANCED SIGNAL PROCESSING TECHNIQUE FOR TRANSLATING FRINGE LINE DISTURBANCES INTO SAMPLE HEIGHT AT A PARTICULAR POSITION ABOVE AN INTERFEROMETER'S SAMPLE STAGE

FIELD OF INVENTION

The field of invention relates generally to measurement techniques; and, more specifically, to a pre-established reference scale for an interferometric topological measurement.

BACKGROUND 1.0 Basic Interferometry

Interferometry involves the analysis of interfering waves in order to measure a distance. Interferometers, which are measurement tools that perform interferometry, typically reflect a first series of optical waves from a first reflecting surface; and, reflect a second series of optical waves from a second reflecting surface. The first and second series of waves are subsequently combined to form a combined waveform. A signal produced through the detection of the combined waveform is then processed to understand the relative positioning of the reflective surfaces. FIG. 1 shows an embodiment of a type of interferometer that is often referred to as a Michelson interferometer.

Referring to FIG. 1, a light source 101 and splitter 102 are used to form a first group of light waves that are directed to a reference mirror 104; and, a second group of light waves that are directed to a plane mirror 103. The splitter 102 effectively divides the light 106 from the light source 101 in order to form these groups of light waves. Typically, the splitter 102 is designed to split the light 106 from the light source 101 evenly so that 50% of the optical intensity from the light source 101 is directed to the reference mirror 104 and 50% of the optical intensity from the light source 101 is directed to the plane mirror 103.

At least a portion of the light that is directed to the plane mirror 103 reflects back to the splitter 102 (by traveling in the +z direction after reflection); and, at least a portion of the light that is directed to the reference mirror 104 reflects back to the splitter 102 (by traveling in the −y direction after reflection). The reflected light from the reference mirror 104 and plane mirror 103 are effectively combined by the splitter 102 to form a third group of light waves that propagate in the −y direction and impinge upon a detector 105. The optical intensity pattern(s) observed by the detector 105 are then analyzed in order to measure the difference between the distances d1, d2 that exist between the plane mirror 103 and the reference mirror 104, respectively.

That is, for planar wavefronts, if distance $d_2$ is known, distance $d_1$ can be measured by measuring the intensity of the light received at the detector 105. Here, according to wave interference principles, if distance $d_1$ is equal to distance $d_2$; then, the reflected waveforms will constructively interfere with one another when combined by the splitter 102 (so that their amplitudes are added together). Likewise, if the difference between distance $d_1$ and distance $d_2$ is one half the wavelength of the light emitted by light source 101; then, the reflected waveforms will destructively interfere with one another when combined by the splitter 102 (so that their amplitudes are subtracted from one another).

The former situation (constructive interference) produces a relative maximum optical intensity (i.e., a relative "brightest" light) at the detector 105; and, the later situation (destructive interference) produces a relative minimum optical intensity (i.e., a relative "darkest" light). When the difference between distance d1 and distance d2 is somewhere between zero and one half the wavelength of the light emitted by the light source 101, the intensity of the light that is observed by the detector 105 is less than the relative brightest light from constructive interference but greater than the relative darkest light from destructive interference (e.g., a shade of "gray" between the relative "brightest" and "darkest" light intensities). The precise "shade of gray" observed by the detector 105 is a function of the difference between distance $d_1$ and distance $d_2$.

In particular, the light observed by the detector 105 becomes darker as the difference between distance $d_1$ and distance $d_2$ depart from zero and approach one half the wavelength of the light emitted by the light source 101. Thus, the difference between d1 and d2 can be accurately measured by analyzing the optical intensity observed by the detector 105. For planar optical wavefronts, the optical intensity should be "constant" over the surface of the detector 105 because (according to a simplistic perspective) whatever the difference between distance $d_1$ and $d_2$ (even if zero), an identical "effect" will apply to each optical path length experienced by any pair of reflected rays that are combined by the splitter 102 to form an optical ray that is directed to the detector 105.

Here, note that the 45° orientation of the splitter 102 causes the reference mirror directed and plane mirror directed portions of light to travel equal distances within the splitter 102. For example, analysis of FIG. 1 will reveal that the reference mirror and plane mirror directed portions of ray 107 travel equal distances within splitter 102; and, that the reference mirror and plane mirror directed portions of ray 108 travel equal distances within splitter 102. As all light rays traveling to detector 105 from splitter 102 must travel the same distance d3, it is clear then that the only difference in optical path length as between the plane mirror and reference mirror directed portions of light (that are combined to form a common ray that impinges upon the detector 105), must arise from a difference between d1 and d2; and; likewise, for planar wavefronts, a difference between d1 and d2 should affect all light rays impingent upon detector 105 equally. As such, ideally, the same "shade of gray" should be observed across the entirety of the detector; and, the particular "shade of gray" can be used to determine the difference between distance d1 and d2 from wave interference principles.

2.0 Interferometer Having a "Tilted" Reference Mirror

Referring to FIG. 2, when the reference mirror 204 is tilted (e.g., such that θ is greater than 0° as observed in FIG. 2), the optical intensity observed at the detector 205 departs from being uniform across the surface of the detector 205 because the differences in optical path length as between plane mirror 203 and reference mirror 204 directed portions of light are no longer uniform. Better said, the "tilt" in the reference mirror 204 causes variation in optical path length amongst the light waves that are directed to the reference mirror 204; which, in turn, causes variation in the optical intensity observed at the detector 205.

Here, as wave interference principles will still apply at the detector 205, the variation in optical path length that is introduced by the tilted reference mirror 204 can be viewed as causing optical path length differences experienced by light that impinges upon the detector 202 to effectively progress through distances of $\lambda/2$, $\lambda$, $3\lambda/2$, $2\lambda$, $5\lambda/2$, $3\lambda$, etc.

(where A is the wavelength of the light source). This, in turn, corresponds to continuous back and forth transitioning between constructive interference and destructive interference along the z axis of the detector 205. FIG. 3a shows an example of the optical intensity pattern 350 observed at the detector 305 when the reference mirror of an interferometer is tilted (as observed in FIG. 2).

Here, notice that the optical intensity pattern 350 includes relative minima 352a, 352b, and 352c; and, relative maxima 351a, 351b, 351c, and 351d. The relative minima 352a, 352b, and 352c, which should appear as a "darkest" hue within their region of the detector 305, are referred to as "fringe lines". FIG. 3b shows a depiction of the fringe lines that appear on a detector when the reference mirror of an interferometer is tilted. Here, ideally, fringe lines that run along the x axis will repeatedly appear as one moves across the z axis of the detector. The separation of the fringe lines is a function of both the wavelength of the light source and the angle at which the reference mirror is tilted. More specifically, the separation of the fringe lines is proportional to the wavelength of the light source and inversely proportional to the angle of the tilt. Hence, fringe line separation may be expressed as $\sim\lambda/\theta$.

FIGURES

The present invention is illustrated by way of example and not limitation in the figures of the accompanying drawings.

FIG. 7b shows a slanted view of the reference standard of FIG. 7a;

FIG. 11a shows a methodology for detecting fringes;

FIG. 11b shows a circuit that may be used to detect fringe lines;

FIG. 16b shows a depiction of the "new" relative positioning of the sample that corresponds to the "new" fringe pattern tracings observed in FIG. 18a;

FIG. 17 shows a depiction of a topography description of a sample derived from the fringe tracings observed in FIGS. 13 and 18a;

FIG. 18a shows an exemplary depiction of a reflectivity vs. lightsource wavelength suitable for characterizing sample composition;

FIG. 18b shows a first methodology that may be used to generate a reflectivity vs. lightsource curve;

FIG. 18c shows a second methodology that may be used to generate a reflectivity vs. lightsource curve;

FIG. 19b shows an exemplary depiction of a sample that could cause the fringe line disturbance patterns observed in FIG. 19a;

FIG. 21a shows a methodology that may be used to follow a particular edge of a fringe line disturbance that is disturbed beyond its associated reference field;

FIG. 21b is an exemplary depiction that applies to the following of a segment of the downward sloped edge of fringe line 1951b of FIG. 19;

FIG. 21c is an exemplary depiction that applies to the following of a segment of the upward sloped edge of fringe line 1951b of FIG. 19.

DETAILED DESCRIPTION

As described below, principles of interferometry are utilized so that an accurate description of the surface topology of a sample can be gained. More specifically, fringe line disturbances observed on the detector of an interferometer (that are caused by the introduction of the sample to the interferometer) are measured against a pre-established reference scale. As a result, the height of the sample can be mapped to specific locations on the surface of the sample; which, in turn, allows for the development of a precise description of the topographical nuances of the sample.

1.0 Mapping of Detector Surface Location to Sample Stage Surface Trace

Figure 4A:
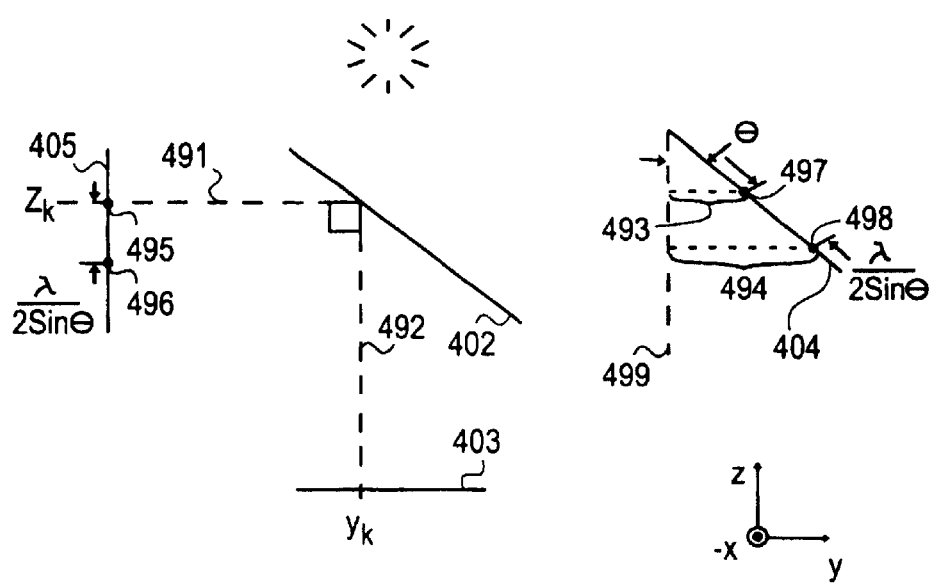
FIG. 4a shows how a fringe line maps to a particular y axis location along the sample stage.
Figure 4B:
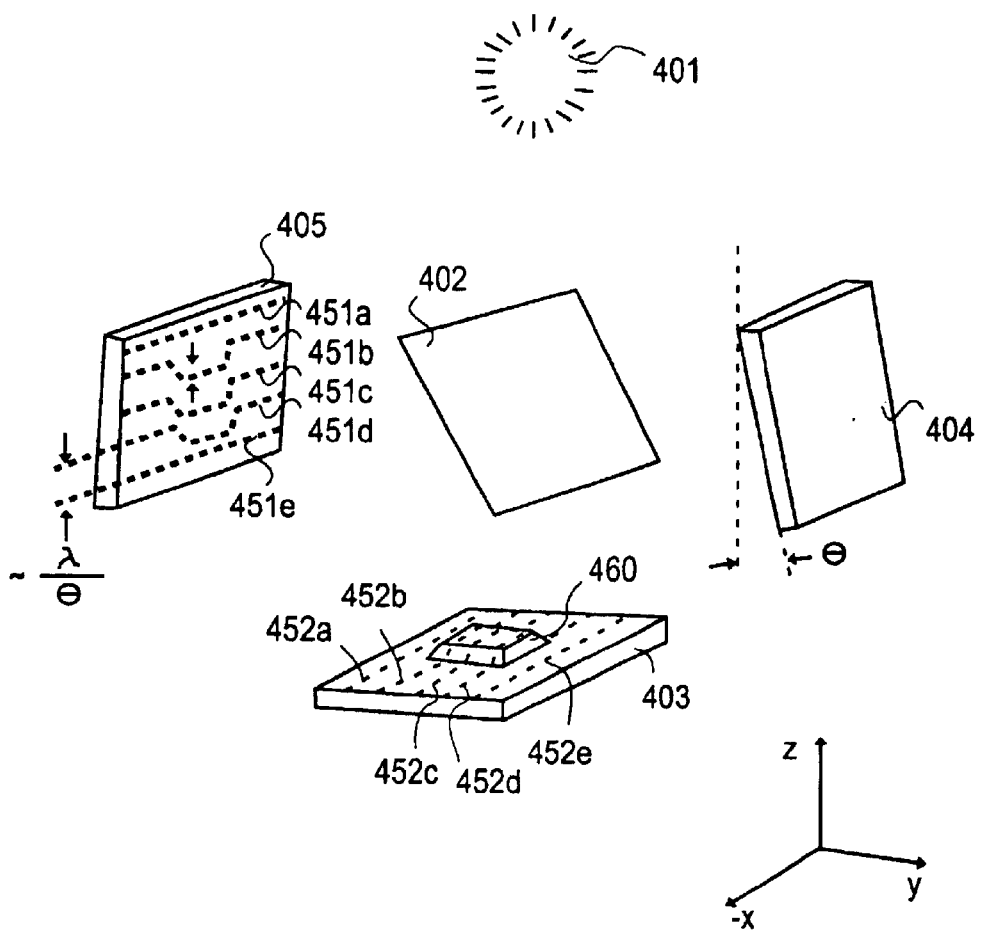
FIG. 4b shows perturbations inflicted upon the fringe lines of an interferometer having a tilted reference mirror as a result of a sample being placed upon the inteferometer's sample stage.

FIGS. 4a and 4b together show an embodiment of the "mapping" that exists between the fringe lines that appear on the detector 405 of an interferometer having a tilted reference mirror; and, the corresponding "traces" of these fringe line on a sample stage 403. Here, the sample stage 403 may have a reflective coating so that, by itself, it behaves the same as (or at least similar to) the plane mirror 103 discussed above in the background section. Referring to FIG. 4a, for a 45° splitter 402 orientation, each fringe line effectively "maps to" a trace that runs parallel to the x axis at a specific y axis location on the sample stage 403. That is, each fringe line "maps to" its 90° reflection off of the splitter 402 and toward the sample stage 403. Here, if the z axis positioning of a fringe line on the detector (e.g., z axis position $z_k$) is projected to the splitter 402 (via projection 491) and "reflected" off of the splitter 402 at an angle of 90° (to form projection 492) to the sample stage 403, the projection 492 to the sample stage 403 will impinge upon a particular y axis location of the sample stage 403 (e.g., $y_k$ as observed in FIG. 4a).

Referring to FIG. 4b, when a sample whose topography is to be measured (e.g., sample 460) is placed upon the sample stage 403, disturbances to the fringe lines (as compared to their original appearance prior to the appearance of the sample) will appear. For each fringe line, the disturbance(s) follow the topography of the sample 460 along its "mapped to" trace that runs parallel to the x axis along the sample stage 403 as described in FIG. 4a. Thus, referring to FIG. 4b, the disturbance of fringe lines 451b, 451c, 451d on the detector 405 "map to" traces 452b, 452c, 452d, respectively on the sample stage 403. Since the sample 460 does not cover traces 452a, 452e of the sample stage 403, fringe lines 451a and 451e remain undisturbed upon the detector 403.

Figure 5:
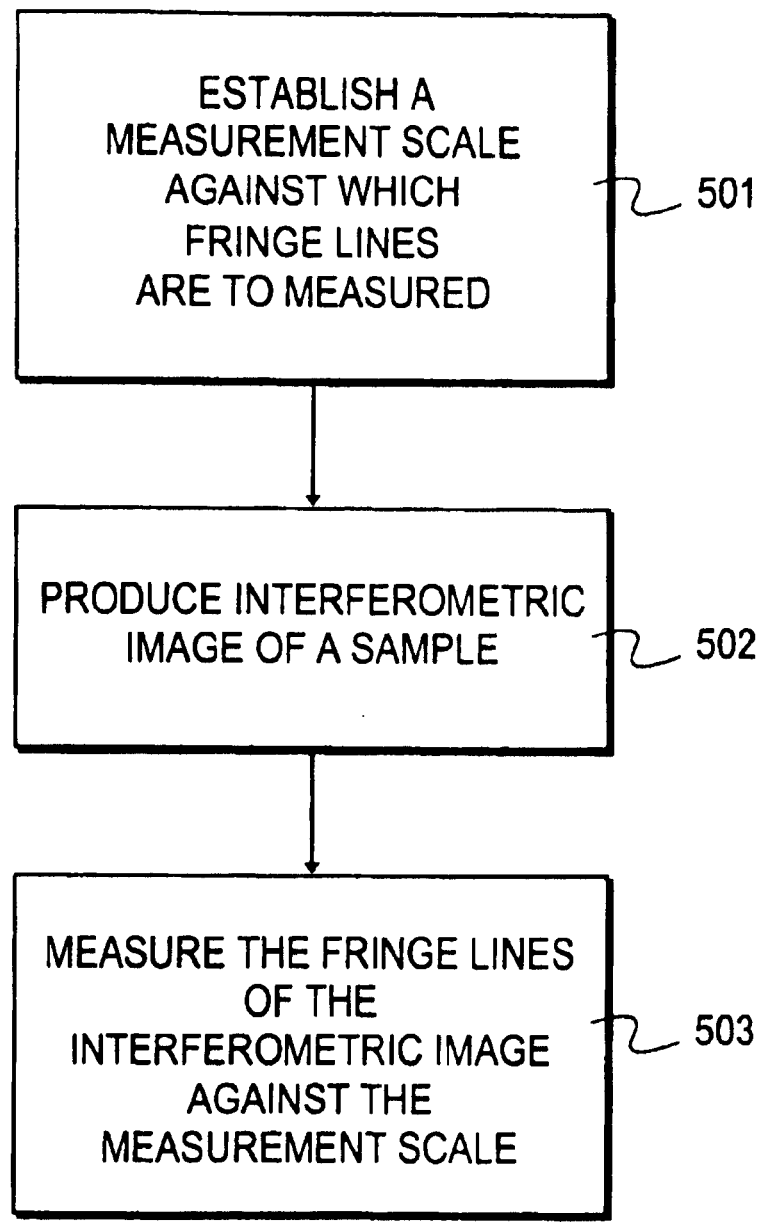
FIG. 5 shows an embodiment of a methodology that may be used to generate a topographical description of a sample.

2.0 Interferometry Measurement Technique Employing a Pre-Established Measurement Scale FIG. 5 shows an embodiment of a methodology for developing a description of the topography of a sample by measuring optical fringe line disturbances (that occur in response to a sample being placed upon the sample stage of an interferometer) against a pre-established measurement scale. According to the approach of FIG. 5, a measurement scale (which may also be referred to as a reference scale, scale, etc.) is first established 501. The measurement scale can be viewed as akin to a ruler that is used to measure fringe line disturbances. As such, when a sample is introduced to the interferometer and an interferometric image of the sample is produced 502, the topography of the sample can be precisely understood by way of measuring the fringe lines against the pre-established measurement scale 503.

Better said, the disturbances experienced by the fringe lines in response to the sample being introduced to the interferometer can be precisely translated into sample height along known locations in the xy plane of the sample stage. The pre-establishment of a reference scale not only allows for highly precise surface topography descriptions but also allows for efficiently produced surface topography descriptions (e.g., in terms of equipment sophistication and/or time expended). FIGS. 6 through 9a, 9b relate to the establishment of a measurement scale; and, a discussion of each of these Figures follows immediately follows below.

3.0 Establishment of Measurement Scale

Figure 6:
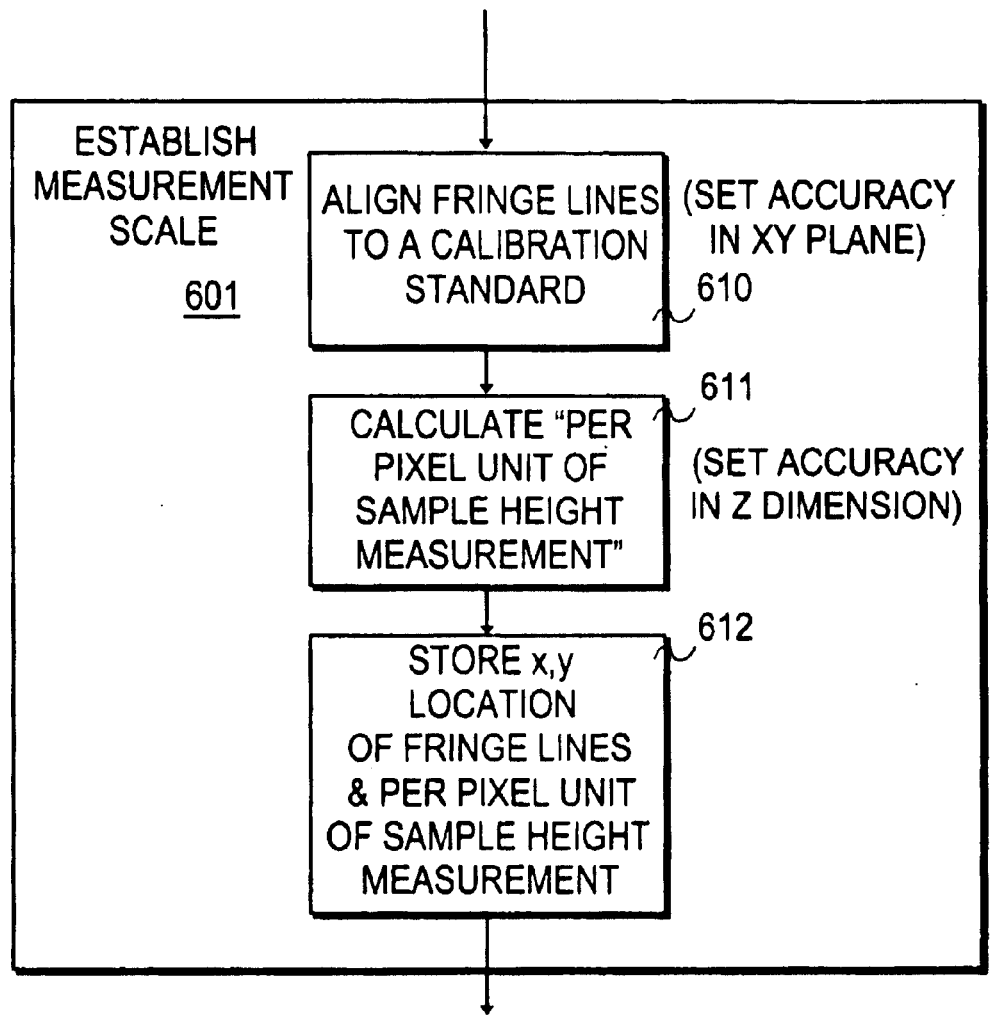
FIG. 6 shows an embodiment of a methodology for establishing a reference scale against which fringe line changes are to be measured.

FIG. 6 shows a methodology for establishing a measurement scale. Note that the methodology of FIG. 6 includes an "accuracy in the xy plane" component 610; and, an "accuracy in the z direction" component 611. Here, referring to FIGS. 4b and 6, setting the accuracy in the xy plane 610 corresponds to producing a measurement scale from which precise positions along the plane of the sample stage 403 can be deduced. Likewise, setting the accuracy in the z direction 611 corresponds to producing a measurement scale from which precise changes in the topographical profile of the sample 460 can be tracked. By combination of establishing accuracy in the xy plane as well as in the z direction, a three dimensional description of the sample can be generated that precisely tracks sample height (in the z direction) across a plurality of x and y positions over the surface of the sample 460 and the sample stage 403.

According to the methodology of FIG. 6, accuracy in the xy plane can be established by aligning 610 the fringe lines that are observed on the detector 405 to be equidistant with those of a calibration standard (noting that, with respect to FIG. 4b, the calibration standard is presented upon the stage 403 rather than a sample 460). Once the fringe lines are aligned 610, a "per pixel unit of sample height measurement" parameter is calculated 611.

Here, an array of optically sensitive devices (e.g., an array of charge coupled devices (CCDs)) may be used to implement the detector 405. Each array location may be referred to as a "pixel". Because of the array, each optically sensitive device that a disturbed fringe line feature runs across will correspond to a unique x,y,z position (above the surface plane of the detector 405) along the topography of the sample. Better said, the setting of the accuracy in the xy plane 610 allows a detector pixel to be "mapped" to a specific position in the xy plane of the sample stage. As such, should a fringe line become disturbed upon introduction of a sample to the interferometer, the distance(s) that the fringe line moves upon the detector from its original, undisturbed pixel locations will correspond to the height of the sample at those particular x,y sample stage positions that the original, undisturbed pixel locations mapped to.

Thus, as each of the optically sensitive devices that make up the array consume a quantifiable amount of surface area on the plane of the detector 405 (i.e., each pixel has a "size"), when measuring the expanse of a fringe line disturbance, each pixel will typically correspond to a particular unit of "height" above the sample stage as measured along the z axis of the detector. Better said, recalling from the discussion of FIG. 4b that fringe line disturbances result from the placement of a sample 460 on the interferometer sample stage 403, a specific change in fringe line position can be translated to a specific sample height.

Here, the height of the sample can be deduced from the distance along the z axis that a fringe line section or portion will "move" along the surface of the detector 405 (i.e., be disturbed) by the introduction of the sample 460 to the interferometer. As such, each pixel position can be correlated to a specific unit distance along the z axis above the surface of the sample stage 403; which, in turn, can be used to "figure out" the height of the sample above the sample stage 403. More discussion of this topic is provided further below with respect to FIGS. 9a and 9b.

For purpose of explaining FIG. 6, however, the amount of unit distance along the z axis above the sample stage 403 that a pixel represents can be referred to as the "per pixel unit of sample height measurement" 611. For example, if the per pixel unit of sample height measurement is 20 nm; and, a fringe line is observed to move 3 pixels along the z axis of the detector 405 when a sample is placed upon the sample stage; then, the sample height will be calculated as 60 nm. As a side note, each pixel's optically sensitive device may be configured so that the optical intensity that impinges upon its unique xz position of the detector 405 is provided as a digital output. For example, each optically sensitive device in the array may be configured to provide a byte of information that represents the optical intensity observed at its particular, unique xz location on the detector 405 surface.

Once the fringe lines have been aligned 610 to a calibration standard and the per pixel unit of sample height measurement is calculated 611, a pre-established measurement scale can be formed by recording 612: 1) information related to the mapping of the detector's fringe lines to the sample stage 403 without a sample being placed on the sample stage (e.g, for each fringe line observed on the detector 405 when a sample is not placed upon the sample stage: a) recording its x,z pixel locations on the detector 405; and b) recognizing how the x,z locations on the detector 405 map to x,y locations upon the sample stage 403); and, 2) the per pixel unit of sample height measurement.

Note that a sample is the "thing" whose surface topography is to be measured. According to the methodology of FIG. 6 then, once the undisturbed fringe lines have been aligned and their mapping position recorded; and, once, the per pixel unit of sample height measurement is calculated and recorded, information has been stored 612 that is suitable for creating a measurement scale that can be used to measure the topography of a sample.

3.1 Aligning Fringe Lines with a Calibration Standard

Figure 7A:
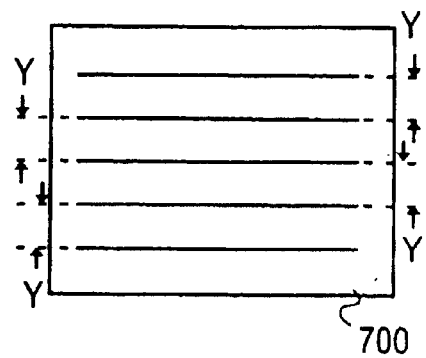
FIG. 7a shows a "top view" of a reference standard.
Figure 7B:

FIGS. 7a through 7c and FIG. 8 relate to a technique for aligning 610 the fringe lines to a calibration standard as discussed in FIG. 6. A calibration standard is a device having markings that are spaced apart with a high degree of precision. For example, the National Institute of Standards and Technology (NIST) provide calibration standards having lengthwise gratings that are spaced evenly apart (e.g., where each grating is spaced 1 $\mu$m apart). An example of a calibration standard is observed in FIGS. 7a and 7b. Here, each grating (or other marking) is spaced evenly apart by a distance of "Y" on the surface of the calibration standard. FIG. 7a shows a "top down" view of an exemplary calibration standard 700 while FIG. 7b shows a slanted view of an exemplary calibration standard 700.

Figure 7C:
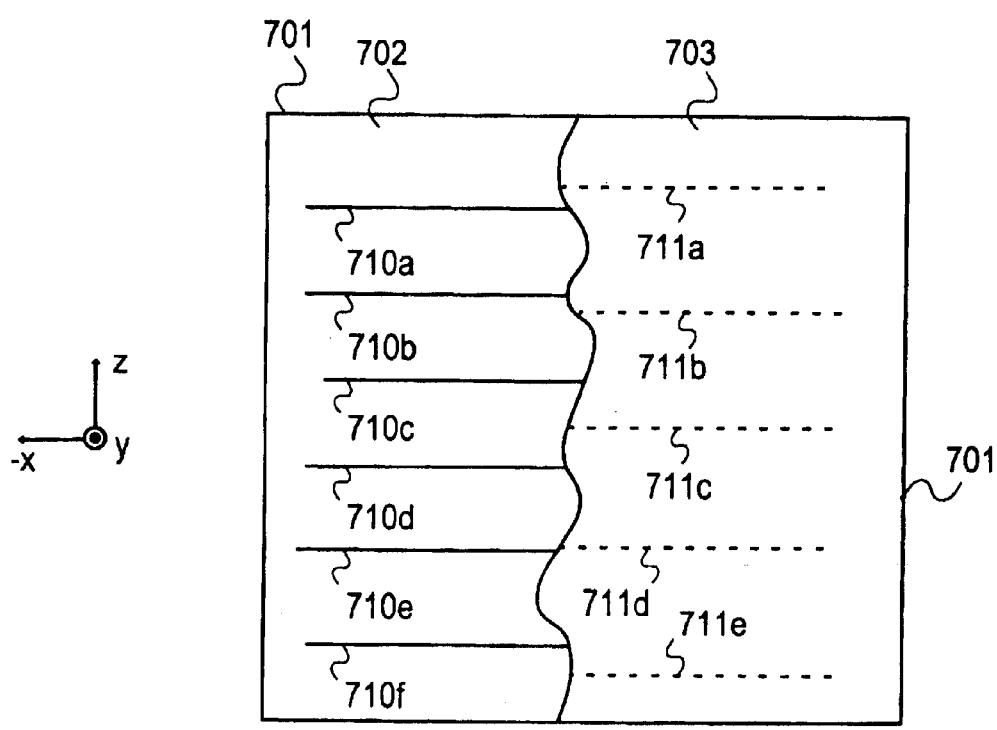
FIG. 7c shows a representation of the image that appears at the detector of an interferometer having a tilted reference mirror when a reference standard is placed on the sample stage.

FIG. 7c shows a representation 701 of the optical image that appears on the detector of an interferometer having a tilted reference mirror when the calibration standard is placed on its sample stage. Here, the optical image will include images of the markings of the calibration standard and the fringe lines that result from the reference mirror of the interferometer being tilted. In the depiction of FIG. 7c, for illustrative simplicity, the calibration markings and fringe lines are shown according to a "split-screen" depiction. That is, the appearance of the calibration standard markings 710a through 710f are shown on the left hand side 702 of the optical image representation 701; and, the appearance of the fringe lines 711a through 711e are shown on the right hand side 703 of the optical image representation.

Figure 8:
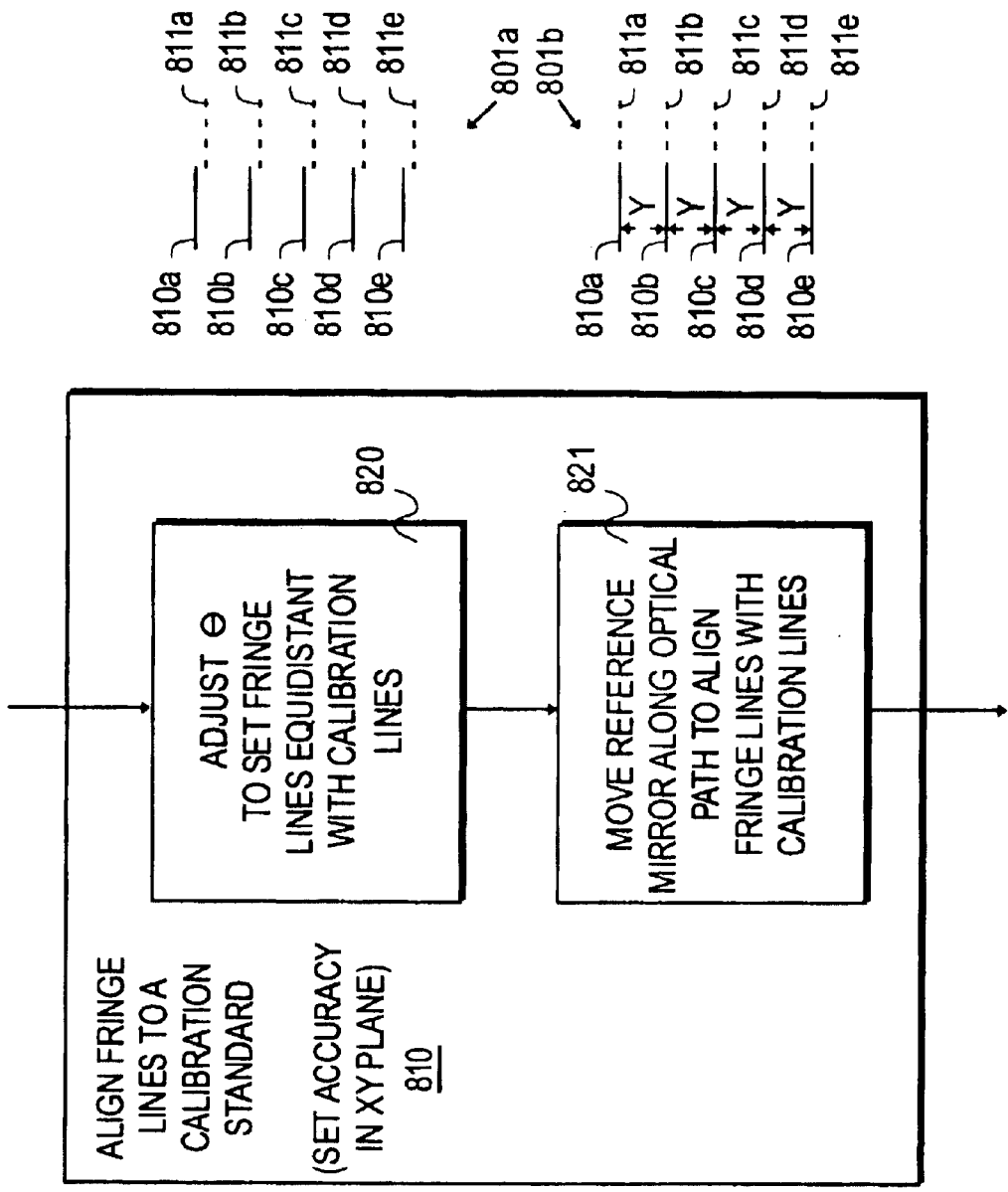
FIG. 8 shows an embodiment of a methodology for aligning fringe lines to the reference lines of a reference standard that is placed on the sample stage of an interferometer.

Note that, in the exemplary depiction of FIG. 7c, the calibration standard should be placed upon the sample stage such that the calibration markings run along the x axis. FIG. 8 shows a technique for aligning the fringe lines 711a through 711e to the calibration markings 710a through 710e within the optical image that was represented in FIG. 7c.

According to the methodology of FIG. 8, and referring to FIGS. 4b and 8 (noting that one should envision the sample 460 of FIG. 4b as being replaced by a calibration standard), the tilt angle of the reference mirror 404 is adjusted to set the spacing of fringe lines 810a through 810e equidistant with the spacing of the calibration markings 811a through 811e as observed in depiction 801a. Here, recall from the discussion of FIG. 3 that the separation of the fringe lines are inversely proportional to the tilt angle $\theta$ of the reference mirror.

As fringe spacing is a function of the tilt angle $\theta$, the fringe line spacing can be made to be equidistant with the calibration marking spacings by adjusting 820 the tilt angle $\theta$ as appropriate. Depiction 801a shows an embodiment where neighboring fringe line spacings are made equidistant with neighboring calibration marking spacings. As such, neighboring calibration markings 810a through 810e having the same spacing ("Y") as neighboring fringe lines 811a through 811e. In other embodiments (e.g., where the density of fringe lines is greater than the density of calibration markings), a fixed number of fringe lines may be set per calibration marking. For example, as just one embodiment, 10 fringe lines may be established per calibration marking allowing for a fringe line density that is 10 times that of the calibration marking density of the calibration standard.

Note, however, that even though the depiction 801a of FIG. 8 shows the fringe line spacings being equidistant with the calibration marking spacings, the fringe lines themselves 811a through 811e are not aligned with the calibration markings 810a through 810e. Here, the position of the reference mirror 404 along the y axis may be adjusted 821. That is, fringe lines can be made to move up or down along the z axis of the detector by adjusting the y axis position of the reference mirror 404; and, according to the approach of FIG. 8, the y axis location of the reference mirror 404 may be adjusted so that, as observed in depiction 801b, the fringe lines 811a through 811e "line up with" the calibration markings 810a through 810e. Note that the fringe lines 811a through 811e are shown to be spaced apart a distance of Y in depiction 801b. This, again, traces back to the spacing of Y between neighboring markings of the calibration standard as originally shown in FIG. 7c. Note that the second process 821 is optional as the setting of the fringe line spacings from process 820 establishes measurement accuracy in the xy plane of the sample stage.

Here, in conjunction with the mapping of the fringe lines to traces that run along the x axis of the sample stage 403 at specific y axis locations (as discussed in detail previously with respect to FIG. 4a), the alignment of the fringe lines to a calibration standard that is placed upon the sample stage 403 allows the relative spacing between the fringe lines to be precisely and accurately correlated to a specific distance along the y axis of the sample stage 403. Thus, if a 1:1 fringe line to calibration marking ratio is established (and the calibration markings are known to be spaced a distance of Y apart), the fringe lines can be used to measure surface changes of a sample as they occur precisely Y apart along the y axis of the sample stage. Similarly, as another example, if a 10:1 fringe line to calibration marking ratio is established (and the calibration markings are known to be spaced a distance of Y apart), the fringe lines can be used to measure surface changes of a sample as they occur precisely 0.1 Y apart along the y axis of the sample stage.

In an embodiment, the understood distance between neighboring fringe lines as they map to the xy plane of the sample stage is normalized by the number of pixels between neighboring fringe lines as observed on the detector. This calculation effectively corresponds to a distance along the y axis of the sample stage (and along the x axis of the sample stage) that each pixel corresponds to (i.e., a distance "per pixel" along both the x axis and the y axis of the detector that each pixel represents).

For example, if 10 pixels exist between neighboring fringe lines on the detector; and, if neighboring fringe lines are understood to map to sample stage traces that are spaced a distance of Y apart as a result of the calibration process— then, a per pixel resolution of 0.1Y in both the x and y directions may be said to exist. In this case, for example, a string of 5 consecutive pixels along the x axis of the detector can be recognized as mapping to a distance of 0.5Y over the surface of the sample stage (or sample); and, likewise, a string of 5 consecutive pixels along the z axis of the detector can be recognized as mapping to a distance of 0.5Y over the surface of the sample stage (or sample).

Here, recalling that a pre-established measurement scale can be partially formed by recording information related to the mapping of the detector's fringe lines to the sample stage, note that storing this per pixel resolution in the x and y direction qualifies as storing information that can be used toward this objective. For example, if the per pixel resolution in the x and y direction corresponds to a distance of 0.1Y; then, undisturbed fringe lines detected to be 30 pixels apart along the z axis of the detector can be recognized as representing traces spaced a distance of 3Y apart along the y axis of the sample stage. Similarly, if fringe lines extend 100 pixels across the x axis of the detector; then, these same fringe lines may be recognized as traces that run over a distance of 10Y along the x axis of the sample.

Lastly, note that distinction should be drawn between the previously discussed "per pixel unit of sample height measurement" (and, which is discussed in more detail immediately below) and the just discussed "per pixel" distance along the x and y axis of the sample stage. Better said, according to the present measurement technique, pixel locations can be used not only to identify a specific position in the xy plane of the sample stage but also to identify sample height along the z axis above the sample stage. The "per pixel" distance along the x and y axis of the sample stage is devoted to the former; while, the "per pixel unit of sample height measurement" is devoted to the later.

3.2 Calculation of Per Pixel Unit of Sample Height Measurement

Referring back to FIG. 6, with the fringe lines being aligned 610 to a calibration standard (e.g., and perhaps a "per pixel" resolution in the x and y directions being recorded), the next procedure in establishing a measurement scale is calculating 611 the per pixel unit of sample height measurement. Recall from the discussion of FIG. 6 that the "per pixel unit of sample height measurement" represents the amount of unit distance along the z axis above the sample stage that a fringe line disturbance of one pixel along the z axis of the detector translates to. As interferometry is based upon optical path length differences between light directed to the reference mirror and light directed to the sample stage, the introduction of a sample to the sample stage effectively changes the optical path length differences that existed prior to its introduction. Better said, at least a portion of the light that is directed to the sample stage (rather than the tilted reference mirror) will have its optical path length shortened because it will reflect off of the sample rather than the sample stage.

Figure 9A:
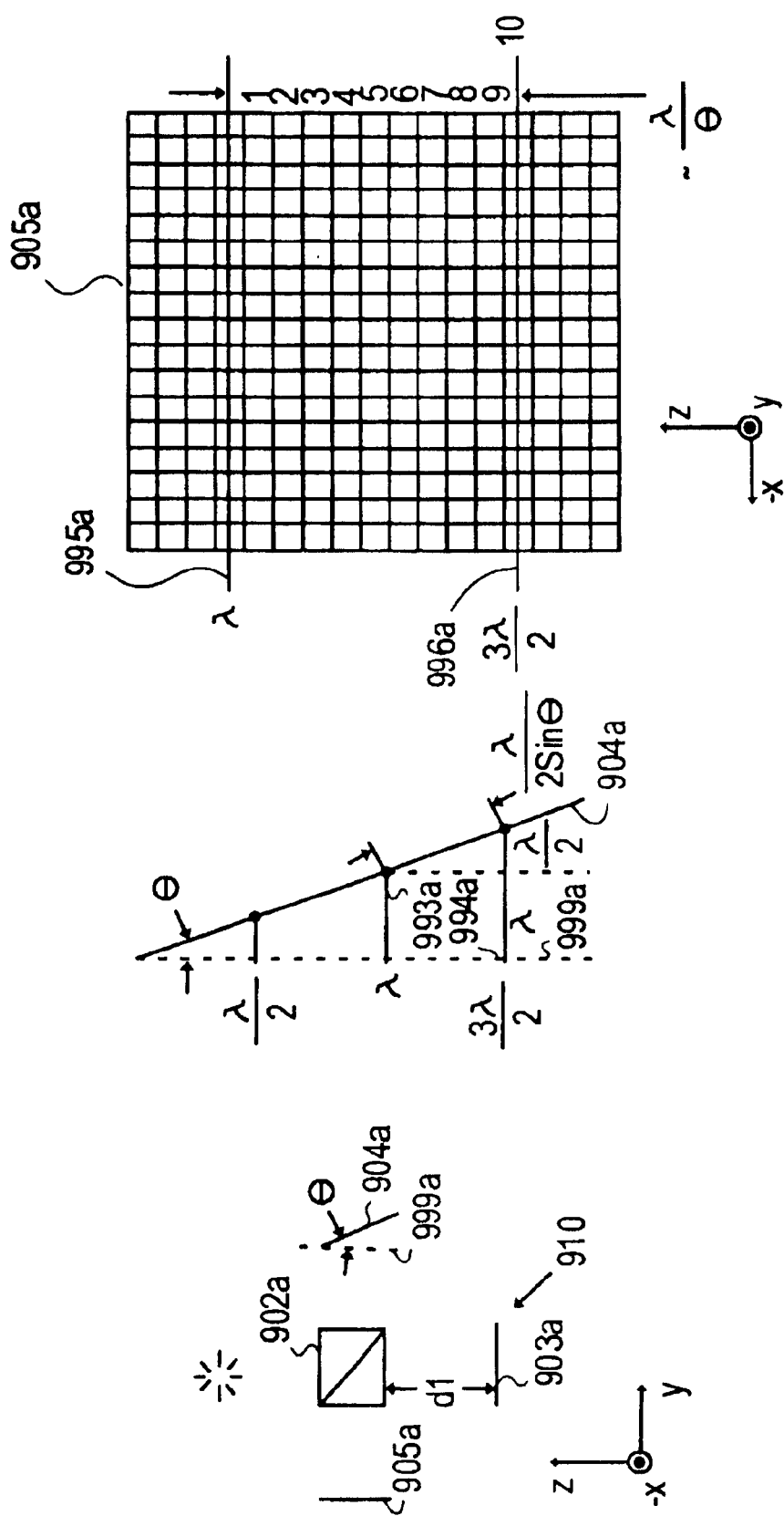
FIG. 9a shows neighboring fringe lines on a CCD array detector for an interferometer having a tilted reference mirror.

This shortened optical path length corresponds to change in optical path length difference; which, in turn, causes a disturbance to the position of a fringe line. Thus, in order to calculate the per pixel unit of sample height measurement, the amount of disturbance in the positioning of a fringe line should be correlated to the change in optical path length that occurs when a sample is placed on the sample stage. Here, in order to better comprehend the change in optical path length, an analysis of an interferometer without a sample is in order; and, an analysis of an interferometer with a sample is in order. FIGS. 4a and 9a relate to the optics of an interferometer without a sample; and, FIG. 9b relates to the optics of an interferometer with a sample. A discussion of each of these immediately follows. By way of comparing the optical conditions that exist with and without a sample (with particular focus on the change in optical path length), the per pixel unit of sample height measurement will be deduced.

Referring now to FIG. 4a, assume a first distance 493 represents a distance of $\lambda$ between the $\theta=0°$ reference plane 499 and the tilted reference mirror 404; and, a second distance 494 represents a distance of $3\lambda/2$ between the $\theta=0°$ reference plane 499 and the tilted reference mirror 404. It can be shown that, when a sample is not placed on the sample stage, a fringe line appears for every integer spacing of $\lambda/2$ between the tilted reference mirror 404 and the $\theta=0°$ reference plane 499. Thus, for example, a first fringe line 495 appears on the detector 405 as a result of the first distance 493; and, a second fringe line 496 appears on the detector 405 as a result of the second distance 494.

This property can be viewed "as if" there is a relationship between: 1) the "intercepts" on the tilted reference mirror 404 of each integer spacing of $\lambda/2$ between the tilted reference mirror 404 and the $\theta=0°$ reference plane 499; and, 2) the location of the fringe lines on the detector itself 405. Better said, recalling from the discussion of FIG. 3 that fringe lines 495, 496 are separated from one another according to $\sim\lambda/\theta$, note also that the intercepts 497, 498 of distances 493, 494 with the tilted reference mirror 404 are spaced $\lambda/(2 \sin \theta)$ apart along the plane of the tilted reference mirror 404 (because distance 494 is $\lambda/2$ longer than distance 493; and, from basic geometry, the hypothenous of a right triangle is a leg of the triangle ($\lambda/2$) divided by the sin of the angle opposite the leg (sin $\theta$)).

Here, as $\sim\lambda/\theta$ is consistent with $\lambda/(2 \sin \theta)$ (particularly for a small angle of $\theta$), a correlated relationship can therefore be envisioned between the: 1) the spacing between the intercepts upon the tilted reference mirror 404 of each integer $\lambda/2$ spacing between the tilted reference mirror 404 and the $\theta=0°$ reference plane 499; and, 2) the spacing between the fringe lines that appear on the detector 405.

Figure 9B:
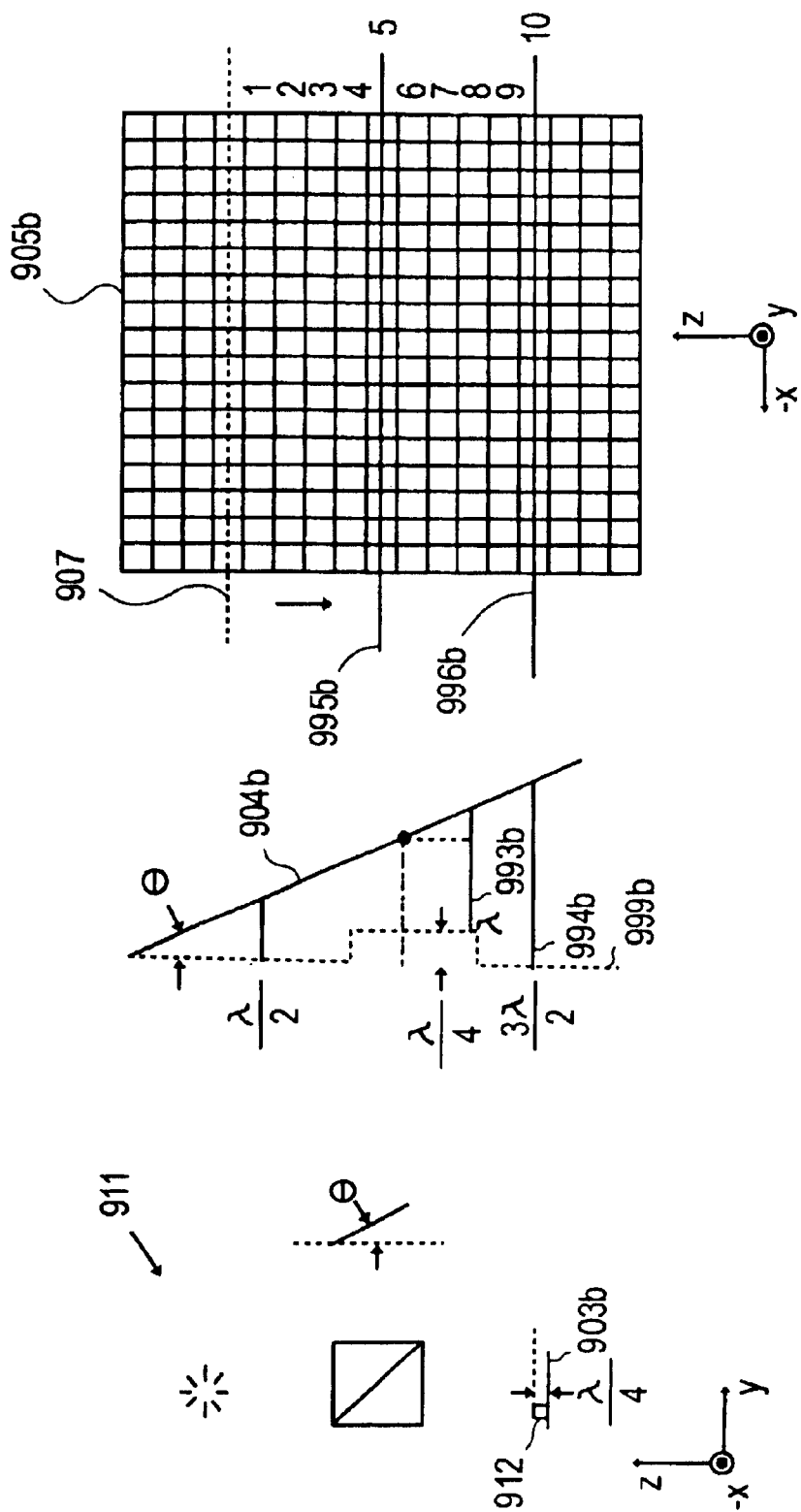
FIG. 9b shows the disturbance caused to one of the fringe lines when a sample having a height of $\lambda/4$ is placed along its optical path.

FIGS. 9a and 9b show an example of the change in fringe line position that occurs when a sample is placed on a sample stage. In particular, FIG. 9a provides further optical analysis when a sample is not placed on the sample stage; and, FIG. 9b provides an optical analysis when a sample is placed on the sample stage. By comparing the pair of analysis, a suitable understanding of the per pixel unit of sample height measurement can be formulated.

Like FIG. 4a, FIG. 9a shows an interferometer 910 without a sample on its sample stage 903a. When an interferometer does not have a sample on its sample stage 903a, the variation in optical path length difference between light directed to the sample stage 903a and light directed to the tilted reference mirror 904a (that causes the appearance of fringe lines on the detector 905a) is largely a function of the distance between the $\theta=0°$ reference plane 999a and the tilted reference mirror 904a. Here, when a sample is not placed on the sample stage 903a, all light directed to the sample stage 903a travels the same distance d1 in traveling from the splitter 902a to the sample stage 903a (and back again).

Thus, the "variation" in path length from the splitter 902a to the tilted reference mirror 904a can be viewed as the "primary contributor" to the "variation" in optical path length difference that occurs between light directed to the sample stage 903a and light directed to the tilted reference mirror 904a; which, in turn, causes the appearance of multiple fringe lines on the detector 905a. Here, as the "variation" in path length from the splitter 902a to the tilted reference mirror 904a clearly occurs within the region between the θ=0° reference plane 999a and the tilted reference mirror 904a, the region between the θ=0° reference plane 999a and the tilted reference mirror 904a serves as a primary region on which to focus the optical analysis.

Recall that, without a sample being placed on the sample stage 903a, a fringe line appears for every integer spacing of λ/2 between the tilted reference mirror 904a and the θ=0° reference plane 999a; and that, a correlating relationship can be envisioned between the spacing of the fringe lines on the detector and the intercept spacings on the tilted reference mirror 404. As such, FIG. 9a shows a first fringe line 995a across a portion of a CCD detector 905a that results from a spacing 993a of A between the θ=0° reference plane 999a and the tilted reference mirror 904a; and, a second fringe line 996a across the same portion of a CCD detector 905a that results from a spacing 994a of 3λ/2 between the θ=0° reference plane 999a and the tilted reference mirror 904a.

Referring to FIG. 9b, note that a sample 912 has been placed on the sample stage 903b of the interferometer 911. Here, it is assumed that the sample 912: 1) has a height (as measured along the z axis) of λ/4; and, 2) is positioned at a y axis location on the sample stage 903b that mapped to fringe line 995a prior to introduction of the sample 912 (as observed in FIG. 9a). In this case, the proper optical analysis can be performed by superimposing the shape of the sample 912 over the θ=0° reference plane 999b at the location of spacing 993a that existed prior to the introduction of the sample 912.

FIG. 9b shows this superposition, which, in turn, modifies the shape of the reference plane 999b. Here, superimposing the shape of the sample at the location of spacing 993a reflects the fact that: 1) the sample 912 is positioned at a y axis location on the sample stage 903b that mapped to fringe line 995a (because spacing 993a "caused" the appearance of fringe line 995a); and, 2) a change in optical path length of λ/4 is caused to that portion of light that is now reflecting off of the sample (rather than off of the sample stage).

The change in optical path length causes a disturbance to the position of the fringe line 995a because the optical path length difference (as between light directed to the sample stage and light directed to the reference mirror) has been changed by the introduction of the sample. As such, fringe line 995a moves down along the detector 905b to a new position (as observed in FIG. 9b by fringe line 995b). The new position for the fringe line 995b corresponds to the same length of spacing 993b (i.e., λ) between the reference plane 999b and the tilted reference mirror 904b that existed before introduction of the sample. However, the modification to the shape of the reference place caused by the shape of the sample 912 effectively brings the same length spacing 993b to a lower position along the z axis. As such, the fringe line 995b also moves down to a lower position on the surface of the detector 905b.

Here, a change of λ/4 drops the fringe line 995b halfway between its original position 907 (before introduction of the sample 912) and fringe line 996b. This arises naturally when one considers that spacing 993b can be broken down into a first segment that is 3λ/4 in length and a second segment that is λ/4 in length (noting that a total length of λ for spacing 993b is preserved). The λ/4 segment helps form a right triangle (observed in FIG. 9b) with the tilted reference mirror 904b; which, from basic geometry, indicates that the intercept of spacing 993b with the tilted reference mirror 904b will move λ/(4 sin θ) along the plane of the reference mirror 904b as a consequence of the sample 912 being introduced to the interferometer 911. Since, there is correlating relationship between the location of the "intercept" on the tilted reference mirror 904b and the location of the fringe line 995b on the detector itself 905b, this corresponds to the movement of the fringe line 995b consuming one half of the distance that once separated it from fringe line 996b.

Consistent with the analysis provided just above, note that a sample 912 height of λ/2 would have caused fringe line 995b to drop far enough so as to completely overlap fringe line 996b. As such, it is apparent that the "per pixel unit of sample height measurement" can be calculated as λ/(2N) where N is the number of pixels between neighboring fringe lines on the CCD detector 905a when a sample is not placed on the sample stage 904a (as observed in FIG. 9a). For example, referring to FIG. 9a, note that there are 10 pixels between neighboring fringe lines 995a and 996a. For a light source having a wavelength of λ=20 nm, this corresponds to a "per pixel unit of sample height measurement" of 1 nm per pixel (i.e., 20 nm/20 pixel=1 nm/pixel). As such, because the introduction of the sample caused fringe line 556a,b to move five pixels, in this example, the sample height can be precisely calculated as 5 nm.

Referring then back to FIG. 6, the "per pixel unit of sample height measurement" can be calculated 611 from the wavelength of the light source λ; and, the number of pixels that are observed to exist between fringe lines when a sample is not placed onto the sample stage. Here, note that the process of aligning 610 the fringe lines with the calibration standard may adjust the spacing between fringe lines on the detector; and, as such, the calculation 611 of the "per pixel unit of sample height measurement" should be made after the position of the fringe lines have been aligned 610.

In an embodiment, once the "per pixel unit of sample height measurement" is calculated 611, information related to the mapping of the detector's fringe lines to the sample stage is stored 612 along with the "per pixel unit of sample height measurement"; which, as already discussed above, corresponds to the storage of information that can be used to effectively construct a measurement scale against which fringe line changes can be measured to determine the topography of a sample.

4.0 Embodiment of Apparatus

Figure 10A:
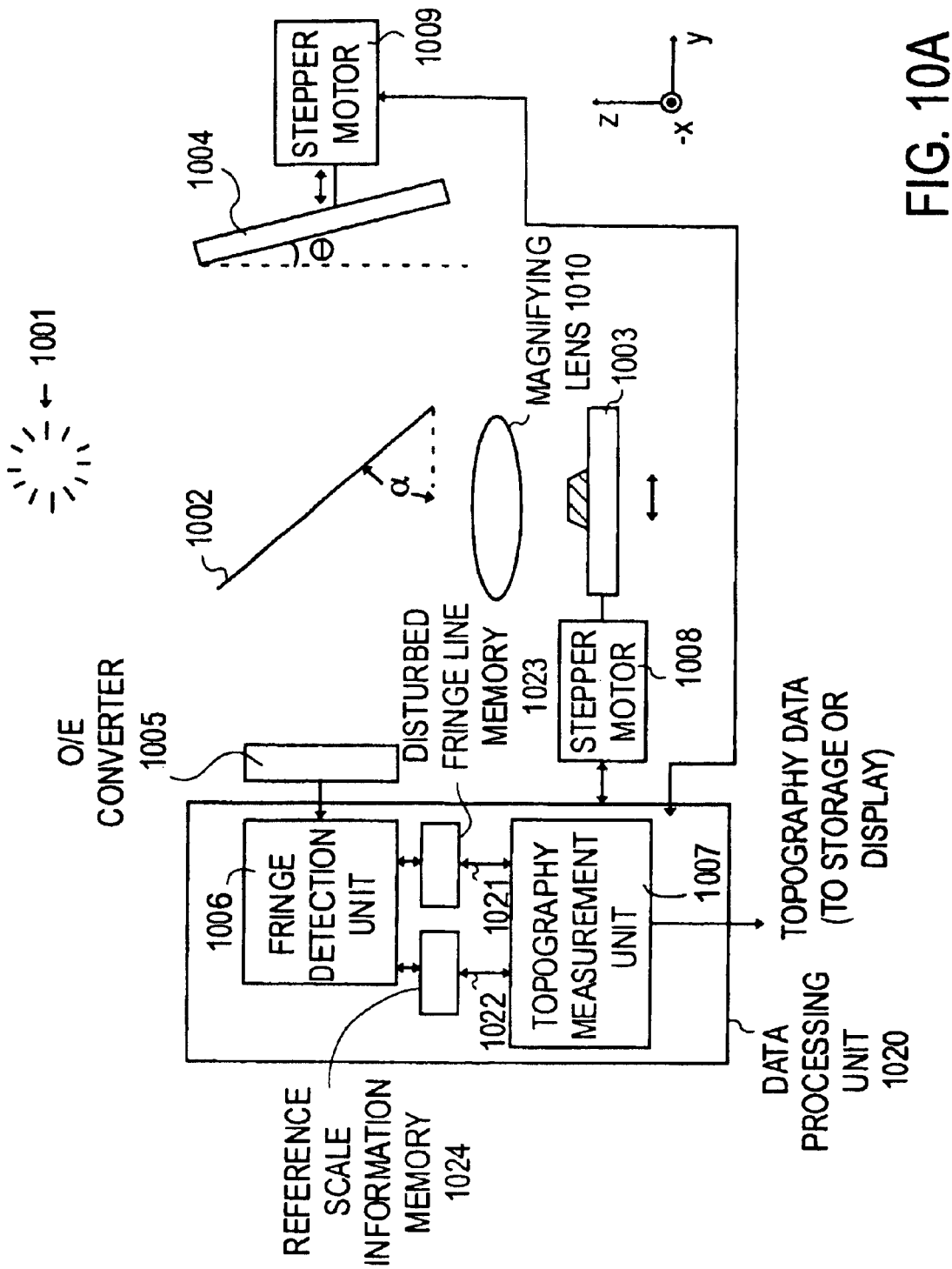
FIG. 10a shows an embodiment of an interferometer having a tilted reference mirror that measures sample topography against a pre-established measurement scale.

FIG. 10A shows an embodiment of a test measurement system that is capable of determining a surface topography by comparing the fringe lines that emerge when a sample is placed on the sample stage 1003 against a pre-established measurement scale. The test measurement system of FIG. 10A includes a light source 1001 and a splitter 1002. The light source may be implemented with different types of light sources such as a gas laser, a semiconductor laser, a tunable laser, etc. A collimating lens or other device may be used to form planar wavefronts from the light from the light source 1001. The splitter 1002 is oriented to direct a first portion of the light from the light source to a reference mirror 1004; and, a second portion of the light from the light source toward a sample stage 1003. The splitter 1002 may be implemented with a number of different optical pieces such as glass, pellicle, etc.

In order to properly direct light as described above, the splitter 1002 is positioned at an angle α with respect to a plane where a surface topology measurement is made (e.g., the xy plane as seen in FIG. 10A). In a further embodiment, α=45°; but those of ordinary skill will be able to determine and implement a different angle as appropriate for their particular application. The splitter 1002 may also be designed to direct 50% of the light from the light from the light source 1001 toward the reference mirror 1004 and another 50% of the light from the light from the light source 1001 toward the sample stage 1003. But, those of ordinary skill will be able to determine other workable percentages.

In a broader sense, the reference mirror 1004 may be viewed as an embodiment of a reflecting plane that reflects light back to the splitter 1002. A reflecting plane may be implemented with a number of different elements such as any suitable reflective coating formed over a planar surface. The reflecting plane may be tilted at an angle θ so that suitably spaced fringe lines appear along the surface of a detector 1005. As discussed, the positioning of θ can be adjusted in order to align the fringe lines to a calibration standard.

The sample stage 1003 supports the test sample whose surface topography is to be measured. After light is reflected from the sample stage 1003 and/or a sample placed on the sample stage 1003, it is combined with light reflected from the reference mirror 1004. The combined light is then directed to detector 1005. In a broader sense, the detector 1005 may be viewed as an opto-electronic converter that converts the optical intensity pattern at the detector surface into an electric representation. For example, as discussed previously, the detector 1005 can be implemented as a charge coupled device (CCD) array that is divided into a plurality of pixels over the surface where light is received. Here, an output signal is provided for each pixel that is representative of the intensity received at the pixel.

A fringe detection unit 1006 processes the data that is generated by the detector 1005. The fringe detection unit 1006 is responsible for detecting the position(s) of the various fringes that appear on the detector 1005. An embodiment of a fringe detection unit 1006 is described in more detail below with respect to FIGS. 11a through 11c; however, it is important to recognize that the fringe detection unit 1006 can be implemented in vast number of ways. For example, the fringe detection unit 1006 may be implemented as a motherboard (having a central processing unit (CPU)) within a computing system (such as a personal computer (PC), workstation, etc.). Here, the detection of fringes may be performed with a software program that is executed by the motherboard. In other embodiments, the fringe detection unit 1006 may be implemented with dedicated hardware (e.g., one or more semiconductor chips) rather than a software program. In other embodiments, some combination of dedicated hardware and software may be used to detect the fringes.

Figure 11C:
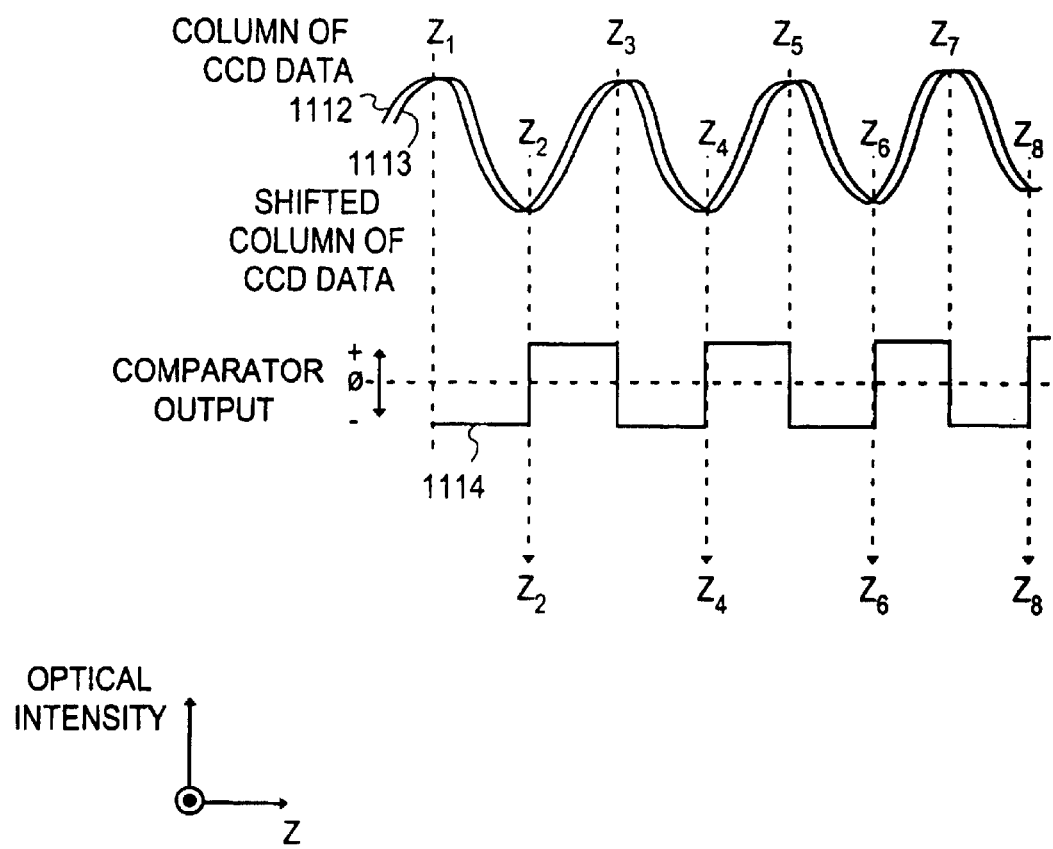
FIG. 11c shows signals that are relevant to the operation of the circuit of FIG. 11b.

FIGS. 11a through 11c elaborate further on at least one embodiment of the fringe detection unit. FIG. 11a provides a methodology 1100 for performing fringe detection. FIG. 11b provides an embodiment of a dedicated hardware circuit 1150 that effectively performs the methodology of FIG. 11a. FIG. 11c displays waveforms that are applicable to the circuit of FIG. 11b. According to the methodology of FIG. 11a, fringes are detected by taking the first derivative 1104 of a column of detector array data. A column of detector array data is the collection of optical intensity values from the pixels that run along the same column of a detector's pixel array. For example, if array 1101 of FIG. 11a is viewed as the CCD detector of an interferometer, a first column 1102 that traverses the array will encompass a "first" column of CCD data, a second column 1103 that traverses the array will encompass a "second" column of CCD data, etc.

The optical intensity values from a column of CCD data should indicate a series of relative minima. That is, as each column of CCD data corresponds to a "string" of optical intensity values that impinge the CCD detector along the z axis and at the same x axis location, if the optical intensity values are plotted with respect to their z axis location, a collection of relative minimum points should appear. This follows naturally when one refers, for example, back to FIG. 3 and recognizes that by traveling along the optical intensity pattern 350 in the +z direction at a fixed x coordinate a series of relative minima will be revealed (e.g., at locations that correspond to fringe lines 352a, 352b, 352c). Another example is provided in FIG. 11c where a typical distribution 1112 of optical intensity values along the z axis and at a fixed x location of the detector is presented.

From the depiction of FIG. 11c, each relative minimum (e.g., at points $z_2$, $z_4$, $z_6$, $z_8$, etc.) will correspond to a fringe line (recalling that a fringe line corresponds to a relative minimum optical intensity as a result of destructive interference). As such, the pixel locations on the detector where fringe lines appear can be precisely identified. Better said, as the x coordinate of the column of CCD data being analyzed is known (e.g., $x_n$); and, as the fringe detection process identifies specific z axis coordinates where a fringe line appears (e.g., $z_2$, $z_4$, $z_6$, $z_8$, etc.), a set of pixel coordinates (e.g., $(x_n, z_2)$; $(x_n, z_4)$; $(x_n, z_6)$; that define the location of each instance of a fringe line can be readily identified for each analysis of a column CCD data.

Taking the first derivative 1104 of a column of CCD data (with respect to the z axis) and then determining 1105 where the first derivative changes from a negative polarity to a positive polarity is a way to identify the z coordinate for each pixel that receives a fringe line for a particular column of CCD data. Although such an approach could be done in software, hardware or a combination of the two, FIGS. 11b and 11c relate to an approach that uses dedicated hardware. Here, a column of CCD data represented by waveform 1112 is provided to input 1108. The column of CCD data 1112 is then presented to both a comparator 1106 and a delay unit 1107. The delay unit effectively provides a delayed or shifted version of the column of CCD data 1112 (as observed with waveform 1113).

The comparator 1109 indicates which of the pair of waveforms 1112, 1113 is greater. Waveform 1114 provides an example of the comparator output 1109 signal that is generated in response to waveforms 1112, 1113. Note that a rising edge is triggered for each relative minima (e.g., at points $z_2$, $z_4$, $z_6$, $z_8$, etc.). One of ordinary skill will recognize that indicating which of the pair of waveforms 1112, 1113 is greater mathematically corresponds to taking the first derivative 1105 of waveform 1112 and determining its polarity. Here, determining where the polarity changes from negative to positive corresponds to identifying a relative minimum (because the slope of a waveform changes from negative to positive at a relative minimum). As such, as seen in FIG. 11c, each rising edge of the comparator output signal should line up with each relative minima of the column of CCD data.

4.0 Embodiment of a Pre-Established Measurement Scale and a Topography Measurement Based Thereon Referring back to FIG. 10A; and, with a description of an embodiment for the fringe detection unit 1006 having been completed (as described just above with respect to FIGS. 11a through 11c), the present section discusses at length an embodiment of the operation of the topography measurement unit 1007. The operation of the topography measurement unit is discussed by way of describing how a precise topography description can be developed. However, before commencing such a discussion, a brief review of the overall methodology will be provided as well as a brief digression into specific details concerning the establishment of the measurement scale.

Referring back to FIG. 5, recall that a measurement scale is first established 501 before a topography measurement is made 503. Here, FIGS. 6 through 9b helped illustrate that the measurement scale can be developed by: 1) aligning the fringe lines to a calibration standard without a sample being placed on the sample stage; 2) recognizing the mapping of the detector's fringe lines to the sample stage; and, 3) recognizing the per pixel unit of sample height measurement. Thus, in an embodiment, the storage of measurement scale information involves the storing of the fringe line positions of an interferometeric image when a sample has not been introduced to the interferometer. This effectively acts as a baseline against which the fringe line disturbances that occur in response to a sample being introduced to the interferometer are compared.

From the discussion of fringe line detection (as performed by the fringe detection unit 1006) provided just above with respect to FIGS. 11a through 11c, it is apparent that the location of the fringe lines over the entirety of the detector 1005 can be determined by performing a fringe detection analysis for each detector column. Thus, a measurement scale can be created by: 1) aligning the fringe lines to the calibration standard without a sample being introduced to the interferometer; 2) detecting the pixel locations where the fringe lines appear on the detector (e.g., by performing fringe detection for each detector column); 3) storing these pixel locations; 4) storing or otherwise recognizing the distance between tracings on the sample stage (as determined through the manner in which the fringe lines map to the sample stage—for example, with the help of a per pixel resolution in the x and y direction parameter)—or, by simply recording the calibration standard spacing; and 5) storing or otherwise recognizing the per pixel unit of sample height measurement based upon the fringe line separation.

Figure 12A:
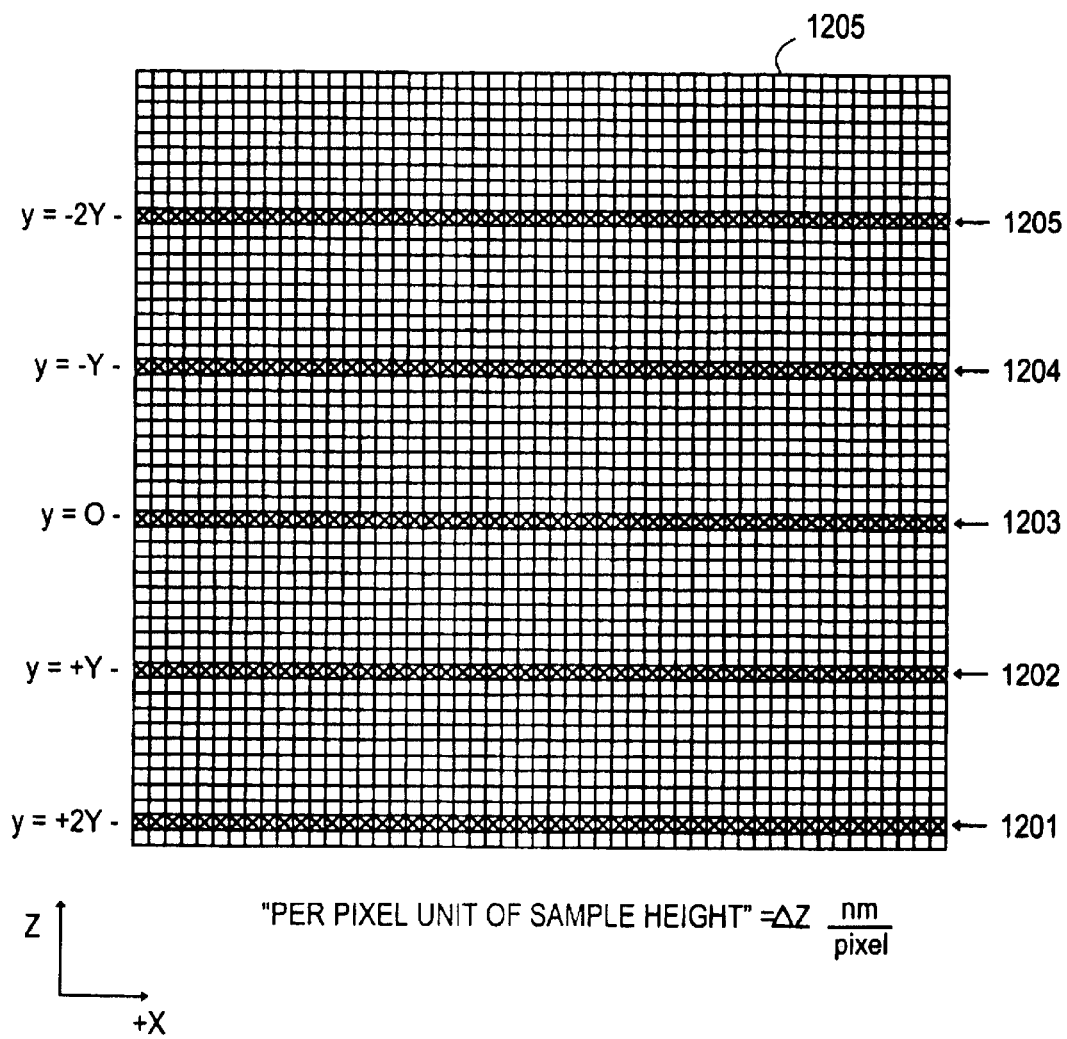
FIG. 12a shows an embodiment of fringe tracings that are used to form a pre-established measurement scale.

FIG. 12a represents the pixel location information which may be stored to help form a stored measurement scale. Here, an array of detector pixel locations are observed and an "X" is placed in each location where a fringe line is detected when a sample is not placed on the sample stage. Thus, as seen in the example of FIG. 12a, five fringe lines 1201, 1202, 1203, 1204 and 1205 are detected. The components of information that can be stored so that a measurement scale can be utilized therefrom may therefore include: 1) the understood spacing between the tracings on the xy plane of the sample stage that the fringe line separations observed on the detector map to (and/or a parameter from which the spacing can be determined such as the per pixel change in x and y direction parameter discussed previously); 2) the location of each fringe line on the detector (e.g., the (x,z) pixel coordinate of each pixel having an "X" in FIG. 12); and 3) the "per pixel unit of sample height measurement" as calculated once the tilt angle of the reference mirror is established. The relevance of each of these is described immediately below.

Recall from FIG. 8 that the alignment of the fringe lines 811a–811e to the calibration standard markings 810a–810e allow the fringe lines 811a–811e to respectively map to sample stage tracings that are spaced a distance of "Y" apart along the y axis of the sample stage. FIG. 12a demonstrates that the stored measurement scale recognizes the separation along the y axis of the sample for each detected fringe line. For example, as just one approach, one fringe line (e.g., fringe line 1203) may be recognized as the "baseline" fringe having a corresponding (i.e., "mapped to") y axis location on the sampled stage defined at y=0.

In an embodiment where each fringe line maps to a trace that runs along the x axis of the sample and that is spaced Y apart from the trace of a neighboring fringe line on the sample stage, trace 1204 will correspond to a y axis location on the sample of y=−Y and trace 1202 will correspond to a y axis location on the sample of y=+Y. Similarly, trace 1205 will correspond to a y axis location on the sample of y=−2Y and trace 1201 will correspond to a y axis location on the sample of y=+2Y. Note that, briefly referring back to FIG. 4a, "higher" fringe lines on the z axis of the detector 405 will map to "lower" positions along the y axis of the detector. As such, the fringe lines 1202, 1201 positioned below the baseline fringe 1203 are given a positive polarity; while fringe lines 1204, 1205 positioned above the baseline fringe 1203 are given a negative polarity.

Figure 12B:
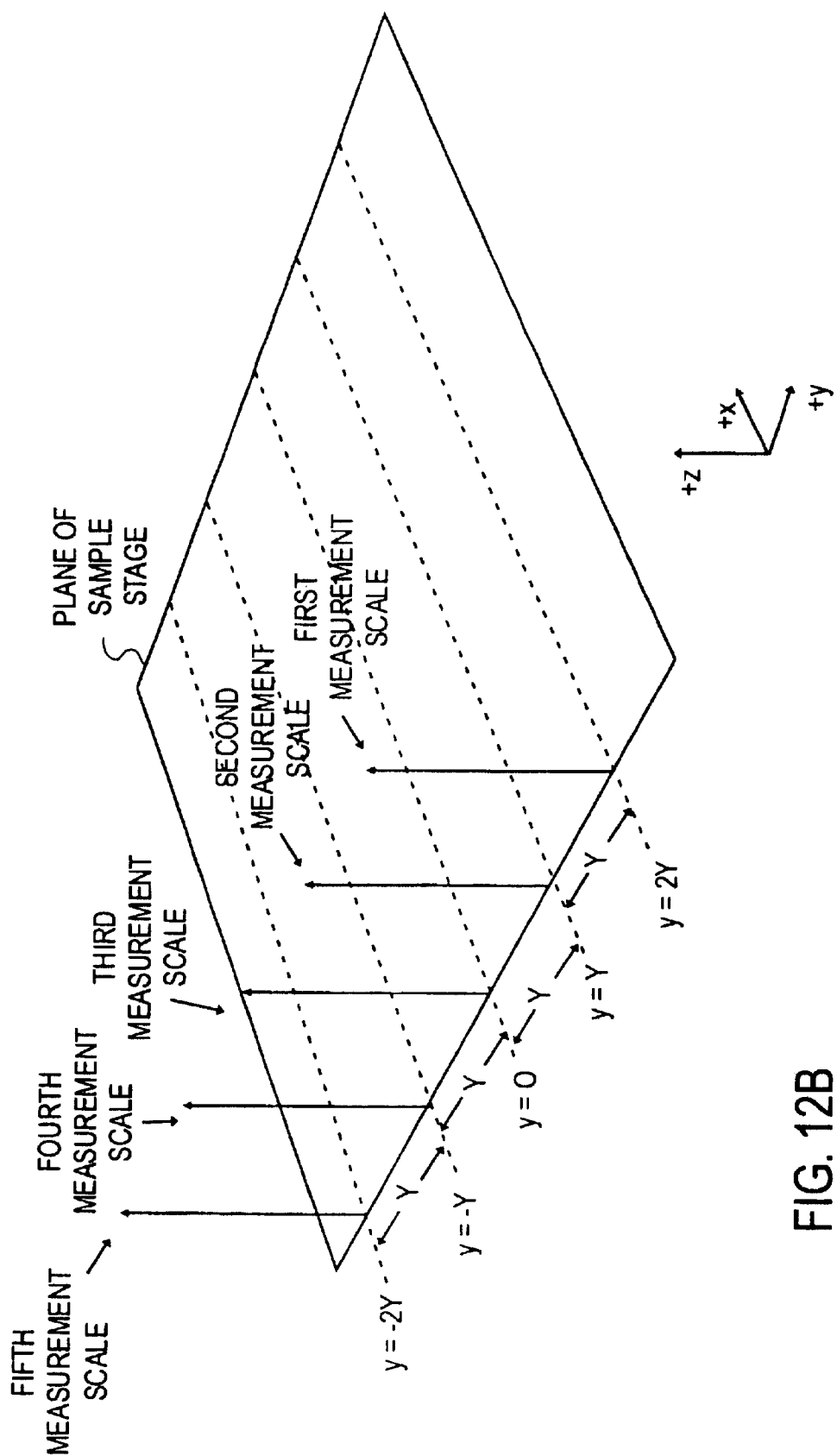
FIG. 12b shows a perspective of a pre-established measurement scale.

Keeping track of the location of each fringe line on the detector (e.g., the (x,z) pixel coordinate of each pixel having an "X" in FIG. 12a), effectively corresponds to the location of a number of different "sub" measurement scales that are located at a specific y axis locations along the sample stage surface. FIG. 12b shows a drawing of this perspective where a collection of measurement scales that each measure sample height along the x axis at a unique y axis location are observed. That is, another way of looking at the pre-established measurement scale, for embodiments where fringe line spacings map to a distance of Y upon the sample stage, is a translation of information received on the detector to a plurality of measurement scales that: 1) are spaced apart a distance Y along the y axis of the sample stage; 2) stand "upright" on the sample stage so as to measure sample height above the sample stage (via the "per pixel unit of measurement height" parameter); and 3) run along the x axis of the detector.

Note that keeping track of the fringe detection locations corresponds to a degree of data compression because pixel coordinates that are not associated with a fringe line (i.e., those not having an "X" in FIG. 12) can be disposed of. Furthermore, as a case of further data compression, if all the fringe detections for a particular fringe line (e.g., each "X" associated with fringe line 1205) lay along the same z axis coordinate—only one data value needs to be stored to represent the entire fringe line (i.e., the z axis coordinate). In order to properly record measurement scale information, the per pixel unit of sample height measurement is also recorded. Note that if "bending" appears in the fringe lines (e.g., due to imperfect optics) correction factors may be applied on a pixel by pixel basis to the fringe line data in order to "straighten out" a fringe line.

As described above with respect to FIGS. 9a and 9b; and, as described immediately below, the per pixel unit of sample height measurement is used to help define the height of the sample at a particular location by factoring it with the disturbance (in pixels) that occurs at a particular (x,z) coordinate location in response to a sample being placed on the sample stage. In a sense, each pixel on the detector corresponds to a "tick" along the vertical axis (i.e., along the z axis) of any of the measurement scales observed in FIG. 12b; where, the distance between "ticks" is the per pixel unit of sample height.

Figure 13:
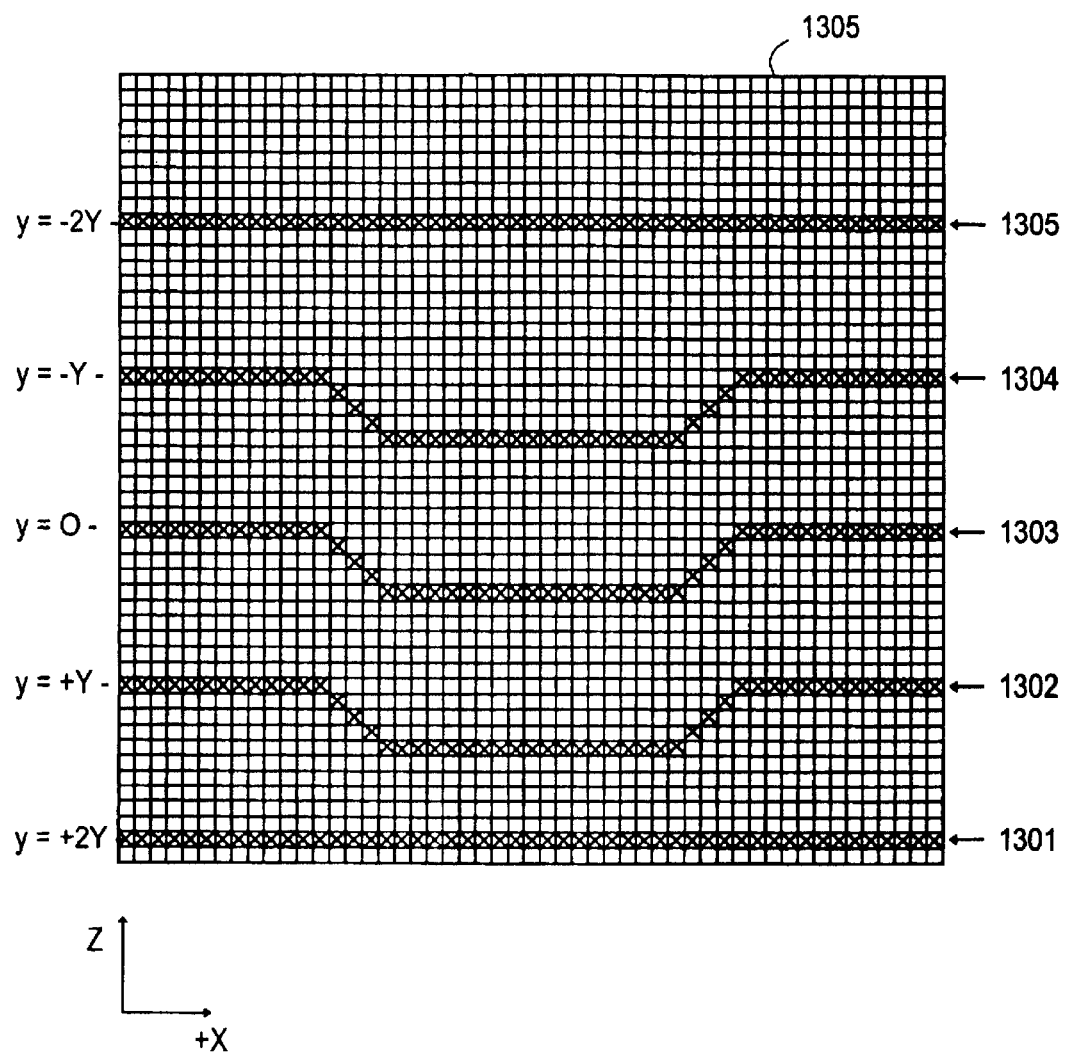
FIG. 13 shows an embodiment of the disturbances that are caused to the fringe tracings of FIG. 12a when a sample is introduced to an interferometer.
Figure 14:
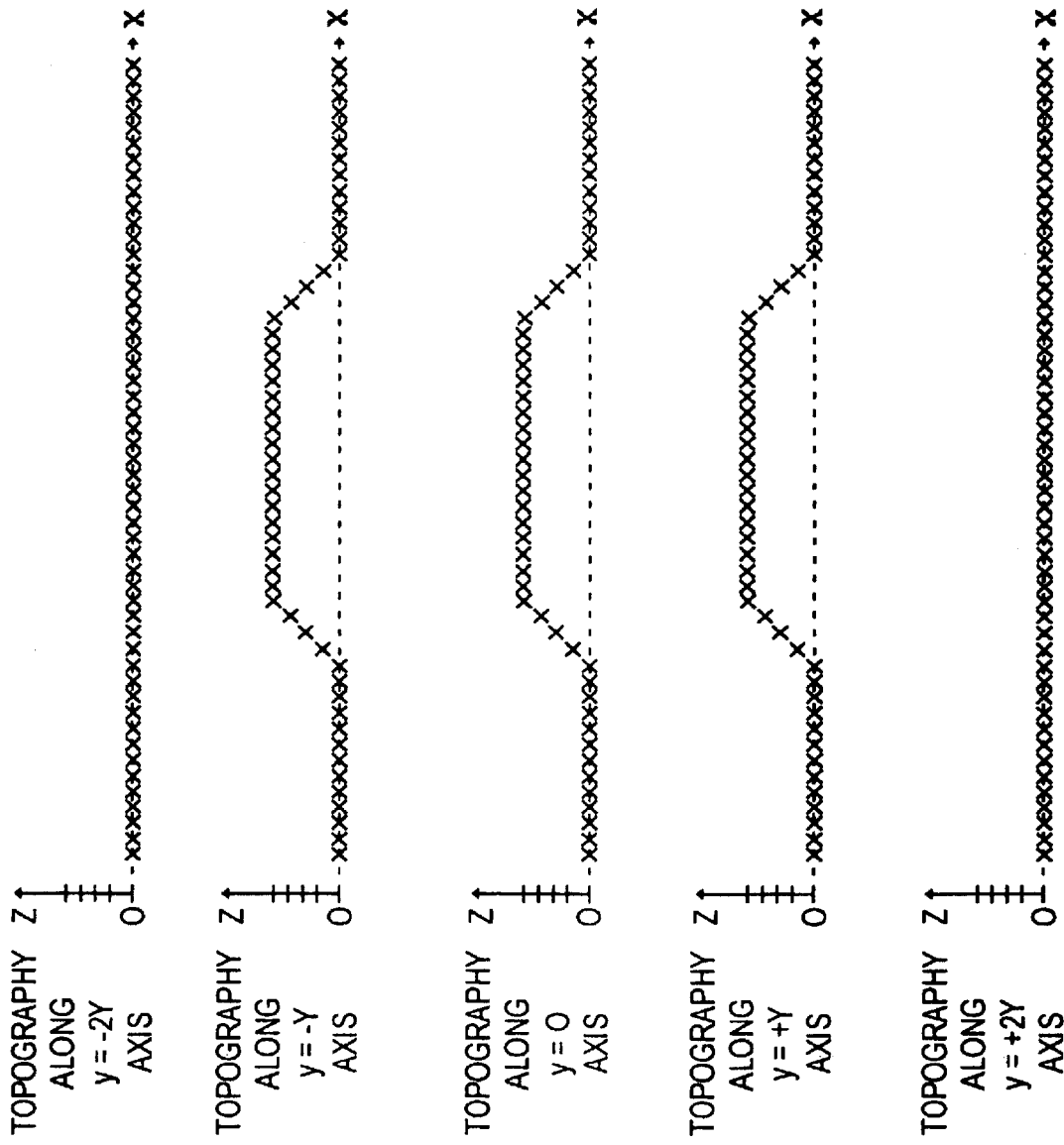
FIG. 14 shows topography information of the sample that is extracted from an analysis of the fringe tracings of FIGS. 12a and 13.

FIG. 13 shows a representation of the fringe lines of FIG. 12a after they have been disturbed in response to the placement of a sample on the sample stage. Here, fringe line 1301 of FIG. 13 corresponds to fringe line 1201 of FIG. 12a, fringe line 1302 of FIG. 13 corresponds to fringe line 1202a of FIG. 12, etc. Note that the fringe lines 1301–1305 of FIG. 13 also correspond to the fringe lines 451e through 451a of FIG. 4b that trace out the profile of a sample 460 having a trapezoidal shape. FIG. 14 shows the result when the differences between corresponding fringe lines from FIGS. 13 and 12a (i.e., the fringe line disturbances) are calculated. For example, by subtracting the fringe lines of FIG. 12a from their corresponding fringe lines of FIG. 13 (i.e., subtracting fringe line 1205 from fringe line 1305, subtracting fringe line 1204 from fringe line 1304, etc.) and multiplying by −1 (to correct for the inverted topography profiles observed in FIG. 13) the profiles 1401 through 1405 of FIG. 14 will result.

Each profile 1401 through 1405 corresponds to an accurate description of the sample's topography at the y axis locations that are defined by the measurement scale. Note that topography profiles 1401 through 1405 are measured vertically in terms of pixels; and, as a result, the "per pixel unit of sample height measurement" parameter can be used to precisely define the sample's height at each x axis location. For example, note that the trapezoid profile reaches a maximum height of 3 pixels. Here, if the "per pixel unit of sample height measurement" parameter corresponds to 1 nm per pixel, the sample will have a measured maximum height of 3 nm.

Figure 15:
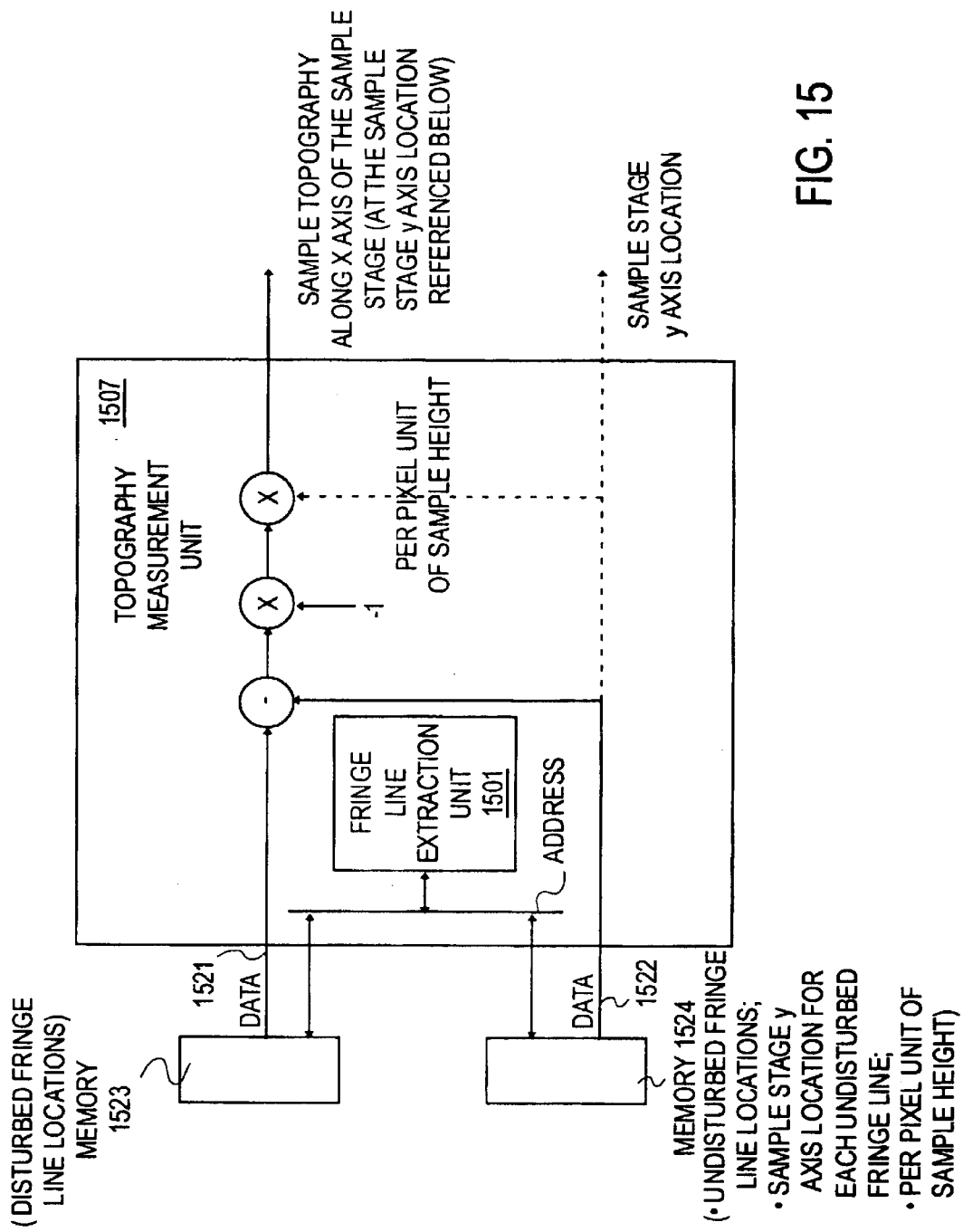
FIG. 15 shows an embodiment of a circuit that may be used to implement the topography measurement unit of FIG. 10A.

While FIGS. 12a, 13 and 14 helped to describe an embodiment of the operation of the topography measurement unit 1007 of FIG. 10A, FIG. 15 shows an embodiment 1507 of a circuit design for the topography measurement unit 1007 observed in FIG. 10A. According to the design of FIG. 15, the stored measured scale data and disturbed fringe line data are received at inputs 1522 and 1521, respectively. Here, information associated with FIG. 12a may be regarded as some of the stored measurement scale data (excluding the per pixel unit of sample of height and the sample stage y axis location that each undisturbed fringe line corresponds to); and, the fringe line patterns observed in FIG. 13 may be regarded as an example of disturbed fringe line data responsive to a sample being placed on the sample stage. In this case, note that input 1521 of FIG. 15 corresponds to input 1021 of FIG. 10A; and, input 1522 of FIG. 15 corresponds to input 1022 of FIG. 10A. Note that, in the particular embodiment of FIG. 10A, the sample data and the stored measurement scale data are extracted from their own memory regions 1024, 1023. If a common memory is used, inputs 1021, 1022 may merge to a common data path.

The fringe line extraction unit 1501 extracts corresponding fringe lines for comparison from their appropriate memory regions 1523, 1524. Here, corresponding pairs of fringe lines may be extracted in light of the manner in which they were stored. For example, if the z axis pixel coordinates for a first fringe line associated with the measurement scale information (e.g., fringe line 1201 of FIG. 12) may be automatically stored (by the detection unit 1006) in a first region of memory 1524; and, if the z axis pixel coordinates for a first disturbed fringe line associated with sample information (e.g., fringe line 1301 of FIG. 13) is automatically stored in a first region of memory 1523 (by the detection unit 1006), these same sets of fringe line data may be extracted by the fringe line extraction unit 1501 by automatically referring to these same memory regions. Thus, fringe lines 1201 and 1301 may be presented together at inputs 1522, 1521, respectively; fringe lines 1202 and 1302 may be presented together at inputs 1522, 1521, respectively; etc.

The sample stage y axis location for these fringe lines may be kept track of (e.g., by being stored along with the pixel locations of each undisturbed fringe line in memory 1524) so that the analysis of the pair of fringe lines that are together presented at inputs 1522, 1521 can be traced to a specific sample stage y axis location. Once a pair of corresponding fringe lines have been extracted, the differences between the disturbed and disturbed locations are calculated and then multiplied by −1 to properly invert the data (note that the factor of −1 may be removed if the reference mirror tilt angle is pivoted at the bottom of the reference mirror rather than the top (as observed throughout the present description)).

This creates a new string of data that represents the sample profile (as measured in pixels) at the y axis location of the sample stage that the pairs of fringe lines correspond to (e.g., profile 1402 of FIG. 14). As such, multiplication of the pixel count at each x axis coordinate by the "per pixel unit of sample height measurement" parameter should produce the correct sample profile from the pair of fringe lines. Beyond the topography measurement unit, the topography profiles may be stored or displayed. They may also be compressed through various data compression techniques to reduce the amount of data to be handled.

Referring back to FIG. 10A, it is important to recognize that the topography measurement unit 1007 can be implemented in a vast number of ways and according to a vast number of different processing schemes. For example, the entire unit 1007 may be implemented with a motherboard (having a central processing unit (CPU)) within a computing system (such as a personal computer (PC), workstation, etc.). Here, the development of topography profiles may be performed with a software program that is executed by the motherboard. Note that if the function of both the fringe line detection unit 1006 and the topography measurement unit 1007 are implemented in software, a computing system may be employed after the O/E converter 1005 to perform the complete topography measurement analysis.

Figure 10B:
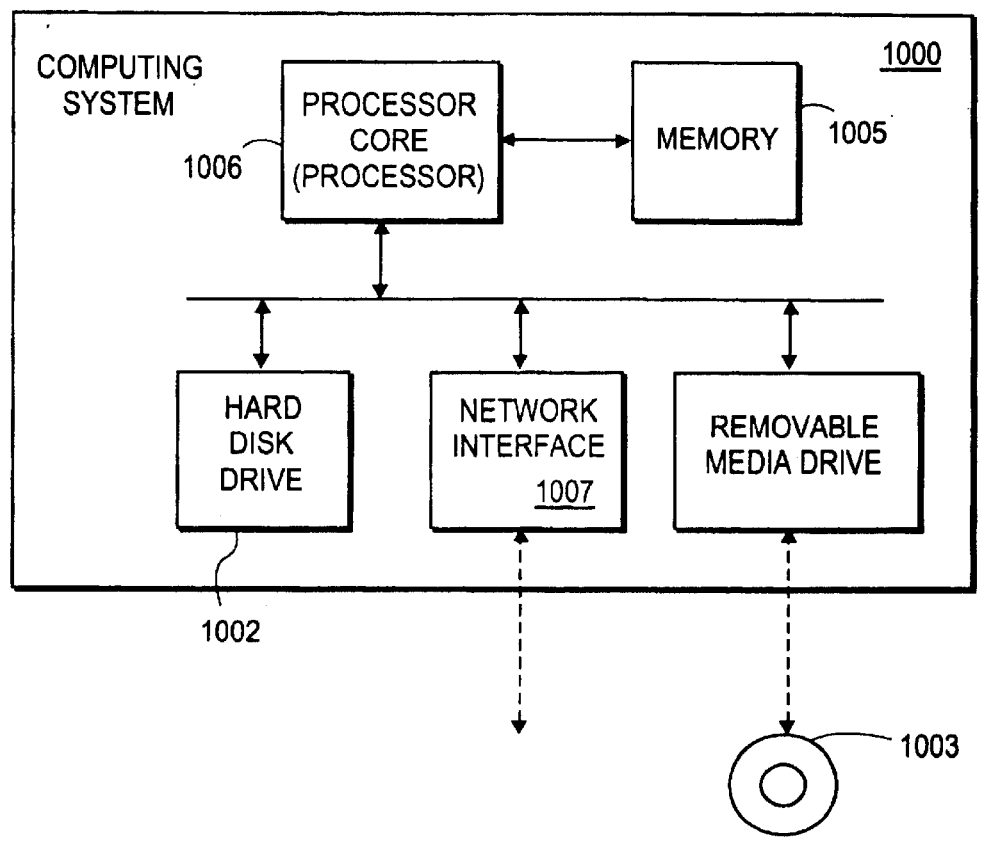
FIG. 10b shows an embodiment of a computing system.

As such, whether or not (or to what degree) data processing is performed through the execution of a software routine and/or dedicated hardware, the processing that is performed "behind" the detector may be viewed, more generically, as being performed by a "data processing unit" 1020. Here, the data processing 1020 unit may be implemented as dedicated hardware (e.g., as suggested by FIG. 10A); or, alternatively or in combination, may be implemented with a computing system. An embodiment of a computing system is shown in FIG. 10B. General purpose processors, digital signal processors (DSPs) and/or general purpose/digital signal hybrid processors may be employed as appropriate as well.

Thus, any of the signal processing techniques described herein may be stored upon a machine readable medium in the form of executable instructions. As such, it is also to be understood that embodiments of this invention may be used as or to support a software program executed upon some form of processing core (such as the Central Processing Unit (CPU) of a computer) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

FIG. 10B shows an embodiment of a computing system 1000 that can execute instructions residing on a machine readable medium (noting that other (e.g., more elaborate) computing system embodiments are possible. In one embodiment, the machine readable medium may be a fixed medium such as a hard disk drive 1002. In other embodiments, the machine readable medium may be movable such as a CD ROM 1003, a compact disc, a magnetic tape, etc. The instructions (or portions thereof) that are stored on the machine readable medium are loaded into memory (e.g., a Random Access Memory (RAM)) 1005; and, the processing core 1006 then executes the instructions. The instructions may also be received through a network interface 1007 prior to their being loaded into memory 1005.

In other embodiments, the topography measurement unit 1006 may be implemented with dedicated hardware (e.g., one or more semiconductor chips) rather than a software program. In other embodiments, some combination of dedicated hardware and software may be used to develop the topography profiles. Further still, multiple topography profiles may be analyzed in parallel (e.g., with multiple implementations of the circuitry of FIG. 15 that simultaneously operate on different sets of fringe line pairs).

Figure 16A:
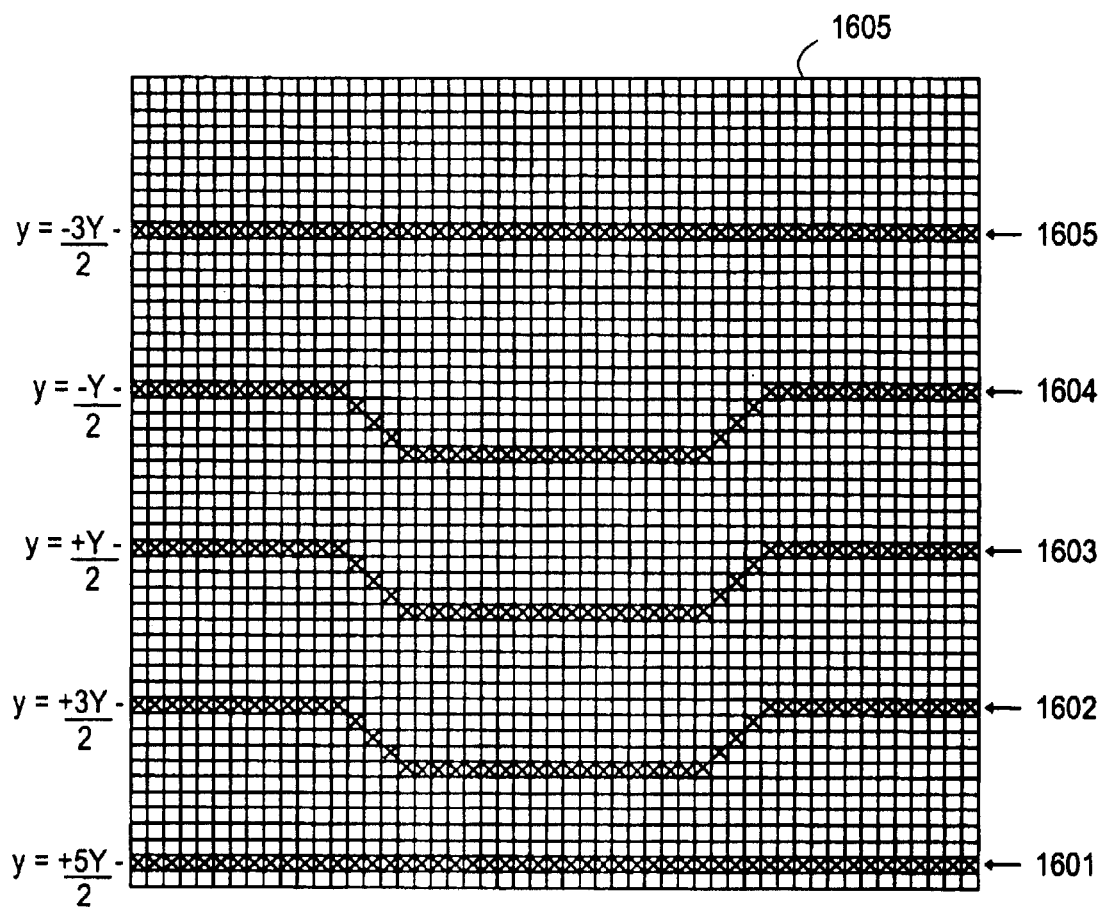
FIG. 16a shows a depiction of a "new" pattern of fringe tracings after a sample is moved along the y axis.
Figure 16B:
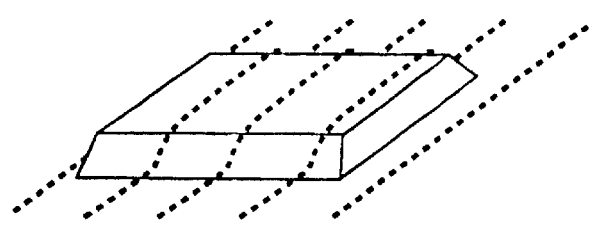
Figure 17:
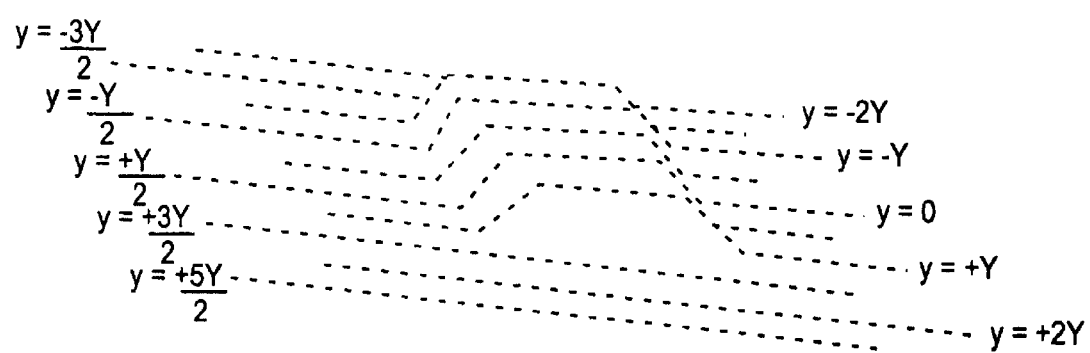

5.0 High Resolution Topographical Description Through Interleaving of Multiple Topographical Measurements FIGS. 16a, 16b and 17 relate to a technique for enhancing the overall resolution of the topography measurement along the y axis of the sample stage. Referring back to FIG. 10A, note that a stepper motor is coupled to the sample stage 1003 which can move the stage along the y axis. Here, for a trace separation of Y as discussed at length above, the sample stage can be moved a distance (e.g., less than Y) to effectively enhance the trace separation resolution.

For example, if the sample stage were moved along the y axis by an amount Y/2, the tracings of the fringe lines would effectively "move" so as to trace over new locations of the sample. FIG. 16b demonstrates an example of these new tracings. Note that these tracings may be compared to the tracings originally observed in FIG. 4b so as to compare the manner in which they have moved. FIG. 16a provides the "new" sample fringes that are detected in response.

FIG. 17 provides an embodiment of the more thorough topography description that results when the topography information from FIGS. 13 and 16a are combined by aligning or otherwise interleaving their profiles at the appropriate y axis locations. The more thorough topography information may be subsequently stored into volatile memory (e.g., a semiconductor memory chip) or non-volatile memory (e.g., a hard disk storage device); and/or may be displayed on a screen so that the topography information can be easily viewed. Note that the control applied to the stepper motor 1008 may be overseen by the data processing unit 1020 of FIG. 10A; and, as such, consistent with the description provided so far, such control may be managed by software, dedicated hardware or a combination thereof.

It is important to note that other approaches can be used to effectively achieve the same or similar effect as described just above. That is, other optical techniques may be employed in order to effectively provide collections of tracings that can be interleaved together so as to form a higher resolution image of the overall sample. For example, according to one approach, the phase of the light emanating from the light source is adjusted in order to "adjust" the positioning of the fringe lines on the detector. Here, the activity of altering the phase of the light will have a similar effect to that of moving the sample stage as discussed above with respect to FIGS. 16a, 16b and 17.

That is, a new relative positioning of the mapping of the fringe lines traces over the sample will arise; which, in turn, creates a "new" set of tracings that can be interleaved with other sets of tracings (formed at different sample stage and/or light phase positionings) so as to form high resolution topography images. According to another related approach, the position of the tilted reference mirror is moved along the optical path axis (e.g., along the y axis as depicted in FIG. 10A) to "adjust" the positioning of the fringe lines.

Again, a new relative positioning of the mapping of the fringe lines traces over the sample will arise; which, in turn, creates a "new" set of tracings that can be interleaved with other sets of tracings. Further still, different light wavelengths may be employed (e.g., different "colors" of light may be used). Here, however, a separate measurement scale should be established for each wavelength of light that is employed.

Regardless as to whether or not or which technique (or combination of techniques) is used to create different sets of interleavable tracings, a word about magnification and the fringe lines is also in order. With respect to magnification, referring back to FIG. 10A, note that a magnifying lens 1010 is included. The "per pixel unit of sample height measurement" parameter and the "per pixel unit of distance along the x and y directions of the sample stage" parameter can be enhanced by incorporating magnification into the interferometer. For example, if without magnification there exist 10 pixels between neighboring fringe lines (e.g., as observed in FIG. 9a), providing 10× magnification will effectively move neighboring fringe lines to be 100 pixels apart rather than 10 pixels apart. Because the fringe lines are still to be regarded as being separated by a distance of $\lambda/2$, the per pixel unit of sample height measurement may still be determined from $\lambda/(2N)$. As such, a tenfold increase in N corresponds to a tenfold increase in per change in sample height.

Figure 1:
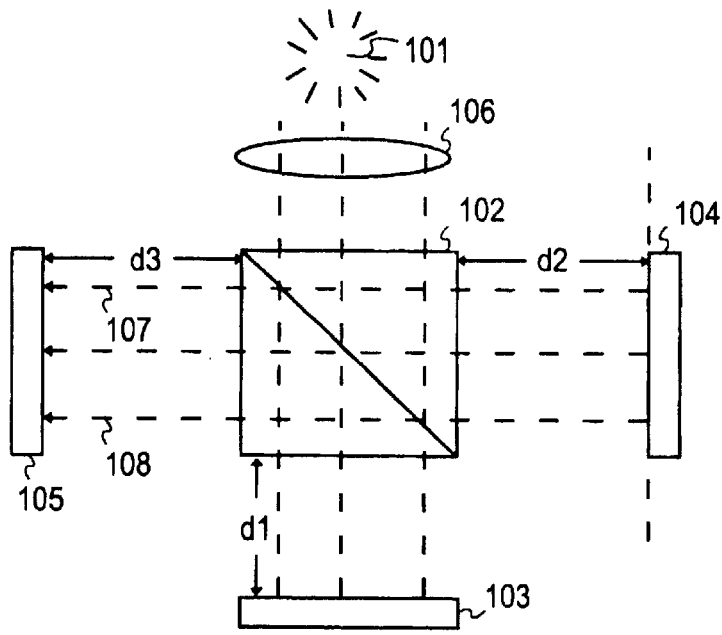
FIG. 1 shows an interferometric measurement system.
Figure 2:
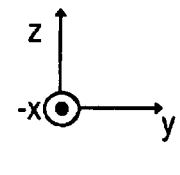
FIG. 2 shows an interferometric measurement system having a tilted reference mirror.
Figure 2:
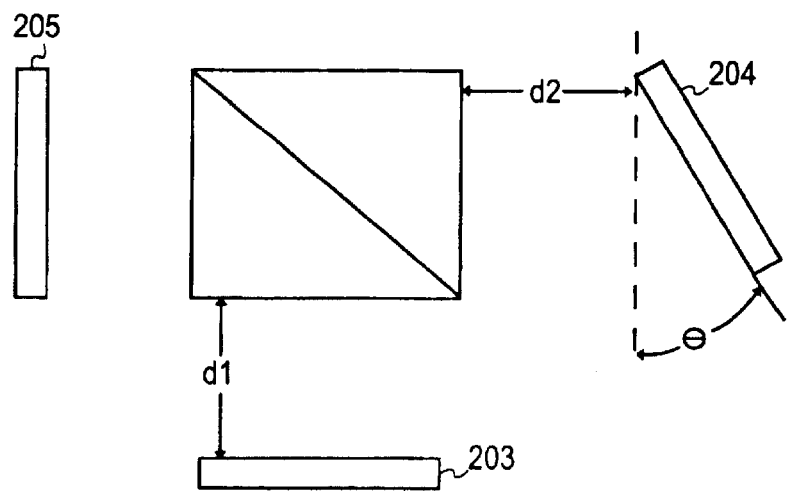
Figure 3A:
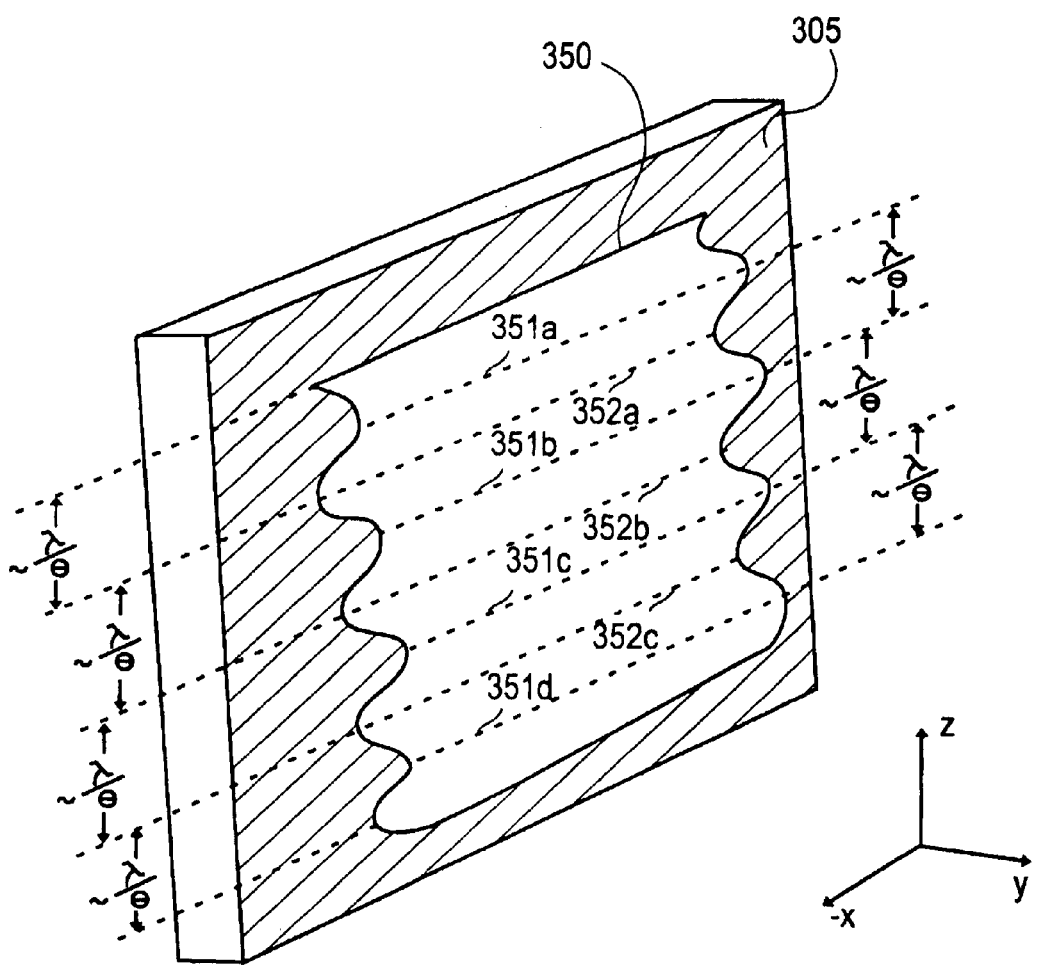
FIG. 3a shows a depiction of an optical intensity pattern that results when the reference mirror of an interferometric is tilted.
Figure 3B:
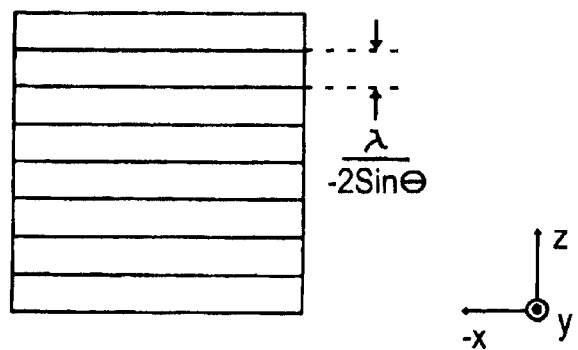
FIG. 3b shows the fringe lines observed at the detector of an interferometer when its reference mirror is tilted.

With respect to fringe lines, note also that (as discussed) the fringe lines observed in FIG. 3 correspond to relative minima locations observed within the optical intensity pattern 350. More generally, as appropriate, fringe lines can be construed as any looked for intensity feature within the optical intensity pattern (e.g., relative minimum positions; relative maximum positions, etc.) whose position(s) is/are disturbed in a manner as described in the preceding description as a consequence of a sample being introduced to the sample stage. Lastly, note also that stepper motor 1009 can be used to adjust the position of the reference mirror 1004 along the y axis and/or adjust the tilt angle of the reference mirror.

6.0 Characterization of Sample Composition Through Analysis of Fringe Line Intensity Information FIGS. 18a through 18b relate to an ensuing discussion that describes how the material composition of a sample can be determined through analysis of the intensity values of the fringe lines that are detected from the interferometer detector. That, is recalling the discussion of FIGS. 11a through 11c and 12a, note that the detection of fringe lines involves the identification of particular pixel locations. As such, once fringe lines have been successfully detected, the optical intensity data used to determine the fringe lines may be disposed of. According a measurement technique described in the present section, however, the optical intensity information is regarded as useful information from which further characterization of the sample, beyond surface topography, may be developed.

More specifically, the material(s) from which the surface (s) of the sample are comprised may be determined by characterizing the reflectivity of the sample surface as a function of the optical wavelength of the interferometer's lightsource. The solid lined graphical component of FIG. 18a provides an exemplary depiction of a "reflectivity vs. wavelength" curve. Here, as reflectivity vs. wavelength is a function of the micro-structural details of a reflecting surface such as conductivity, lattice spacing, lattice type, etc.,; and, as particular materials or substances (e.g., a pure material such as Cobalt (Co); or, an alloy or other combination of materials such as Silicon Nitride ($Si_3N_4$), "Nickel Iron" ($Ni_{100-x}Fe_x$), etc.) have particular values for these same micro-structural details, the "reflectivity vs. wavelength" curve of a particular material or substance often uniquely defines it.

Better said, different materials or substances tend to exhibit different "reflectivity vs. wavelength" curves; and, as such, by developing a sample's "reflectivity vs. wavelength" curve, the material or substance from which it (the sample) is comprised can be determined. Here, rather than disposing the optical intensity values observed at the detector, they may be analyzed so as to determine a particular reflectivity of the sample for a particular wavelength of the interferometer's optical source.

By changing the optical source's wavelength; and, by monitoring the change in reflectivity of the sample in response thereto, a "reflectivity vs. wavelength" curve can be measured for the sample. This, in turn, can be used to determine the material composition(s) of the sample itself. FIG. 18a provides exemplary results from such a measurement where specific measured reflectivity data points are plotted vs. the applied wavelength. As the data points trace out the reflectivity curve of the sample, the composition of the sample can be determined.

In various embodiments, optical intensities observed at the pixel locations where fringe lines are detected are used to perform the reflectivity analysis. Thus, in some cases, not only are the pixel locations of detected fringe lines employed (to develop the surface topography description of the sample); but also, the optical intensity values of the same fringe lines are used to help characterize the material(s) from which the sample is comprised.

However note also that, seizing upon the notion that a fringe line may be construed where appropriate so as to correspond to something other than a relative minimum, it some cases it may useful to track relative maximum optical intensity values rather than relative minimum optical intensity values for the sake of performing a reflectivity analysis. Thus, in some cases, a fringe line used for topography purposes may be the same fringe line used for reflectivity analysis (e.g., both are relative minimum); while, in other cases a fringe line used for topography purposes may be different from a fringe line used for reflectivity analysis (e.g., one is a relative minimum while another is a relative maximum).

Also, in further embodiments, interferometer characteristics that are spatially and/or wavelength dependent may be characterized beforehand so that any resulting detrimental affect(s) upon a reflectivity measurement can be successfully canceled out. For example, if a first pixel location is known to observe less light intensity than a second pixel location (e.g., on account of optical imperfections associated with the interferometer), those of ordinary skill will be able separate optical intensity differences (as between the pair of pixels) that are attributed to the interferometer's imperfections from those that are attributable to the sample's own characteristic reflectivity properties. The same may be said for an interferometer's wavelength related inconsistencies or imperfections (if any).

In a simplest case, the methodology of which is observed in FIG. 18b, the sample is assumed to be uniformly comprised of a single composition (e.g., the sample is uniformly comprised of Co; or, uniformly comprised of $Si_3N_4$, etc.). Because of the uniform composition of the sample, the fringe lines are "free to move" over the surface of the detector without affecting the overall reflectivity experiment. Here, recalling from the Background that fringe lines are separated in accordance with $\sim\lambda/\theta$, the adjusting 1811 of the optical source wavelength ($\lambda$) between reflectivity calculations (or at least optical intensity recordings) 1810 will cause the fringe lines to move upon the surface of the detector. However, because spatial and wavelength related inconsistencies of the interferometer can be canceled out; and because, the sample has uniform reflectivity, the "reflectivity vs. wavelength" curve can be recorded irrespective of fringe line position.

In a more likely scenario, which is elaborated upon in FIG. 18c, it may be more desirable to realign the fringe lines with each change in wavelength. That is, after the wavelength is changed 1821, an attempt is made to re-position 1822 the fringe lines so that appear in the same position that they did during exposure at the previous wavelength. This allows the measurement to determine reflectivity at specific regions of the sample because of the manner in which they map to the sample stage. As such, should the sample be comprised of different mixtures of materials or substances (e.g., a first regions is Silicon (Si) and a second region is Copper (Cu)), the interferometer is capable of identifying different mixtures on a pixel-by-pixel basis.

That is, a first "reflectivity vs. wavelength" curve can be measured for the portion of the sample that maps to a first pixel location; and, a second "reflectivity vs. wavelength" curve can be measured for the portion of the sample that maps to a second pixel location. By keeping track of separate curves for different pixels (or perhaps different groups of pixels), should the sample have different materials/substances at the mapped to locations, different "reflectivity vs. wavelength" curves will reveal themselves as between the different pixel locations. As such, different materials/substances can be identified at precise sample locations.

Fringe lines may be re-positioned 1822, for example, by adjusting the tilt angle of the reference mirror so as to compensate for the movement that was caused by the change in wavelength. As such, a "new" data point for a "reflectivity vs. wavelength" curve can be generated by: 1) changing 1821 the wavelength of the lightsource; 2) adjusting 1822 the fringe lines so as to overlap with their position(s) that existed prior to the wavelength change; and 3) calculating and storing reflectivity at the fringe lines (or at least storing the observed intensity so that intensity can be later calculated) 1820. Note that reflectivity calculations can be readily made by those of ordinary skill because those of ordinary skill recognize that observed intensity is proportional to the reflectivity of the sample.

Note that, similar to the technique discussed previously with respect to FIGS. 16a, 16b and 17, once a first group of reflectivity curves have been developed for a first set of fringe line positions (e.g., by looping through the methodology of FIG. 18c multiple times for the first set of fringe line positions), a second group of reflectivity curves may be developed for a second set of fringe line positions (e.g., by looping through the methodology of FIG. 18c multiple times for the second set of fringe line positions).

The corresponding groups of reflectivity curves may then be interleaved (e.g., akin to the concept discussed with respect to FIG. 17) so that sample composition can be determined to a finer degree of resolution. Note also that procedures for performing sample "reflectivity vs. wavelength" analysis (e.g., as described just above) may be combined with (e.g., by preceding or by following) procedures for determining sample topography (e.g., as discussed in preceding sections) so that a complete description of a sample that measures both its surface topography and its material composition can be realized.

Also, referring briefly back to FIG. 10a, the data processing unit 1020 may be configured to keep track of the measured reflectivity vs. wavelength curves (e.g., via software or hardware). Furthermore, the data processing unit 1020 may be configured to compare the measured curves against a data-base of such curves for known materials or substances (e.g., by correlating the measured curves against the curves stored in the database) so as to determine that a particular curve matches the curve of a known material or substance. Since many of these techniques can be implemented in software, they may be embodied in a machine readable medium.

7.0 Signal Processing Techniques for Measuring Fringe Line Disturbances That Extend Outside Their Associated Reference Fields Referring back to FIG. 13, note that the fringe line disturbances are "agreeable" in the sense that each fringe line disturbance remains within its corresponding reference field. A reference field corresponds to the field of optical image data that resides adjacent to a fringe line that the fringe line, when disturbed, will first project into in order to demonstrate a change in sample height. For example, referring to FIG. 12a the field of image data between fringe lines 1204 and fringe line 1203 correspond to the reference field for fringe line 1204, the field of image data between fringe lines 1203 and fringe line 1202 correspond to the reference field for fringe line 1203, etc.

Comparing FIGS. 12a and 13 then, note that the combination of maximum sample height and fringe line spacing is such that each fringe line disturbance is kept within its own reference field. This makes for relatively straightforward generation of the sample topography profiles observed in FIG. 14. That is, the pixel locations of an entire fringe line and its associated disturbances can be readily stored, alone (i.e., without being accompanied by the pixel locations of other fringe lines) to a particular memory location (e.g., that is partitioned for the fringe's lines reference field) and compared to is corresponding undisturbed fringe line position.

Thus, in general, according to various embodiments, a pre-defined maximum, measurable/allowable sample height may be recognized such that fringe line disturbances are designed to be kept within their corresponding field of reference. This keeps the signal processing needed for deriving topographical information nearer a minimum degree of sophistication. Note that any such "maximum height" configuration can be easily established through manipulation of fringe line spacing (e.g., adjustment of tilt angle θ). Furthermore, measurement resolution is not lost because interleaving techniques (e.g., as discussed with respect to FIGS. 16a, 16b and 17) can be used as appropriate to develop topographical descriptions having a desired resolution.

Figure 19A:
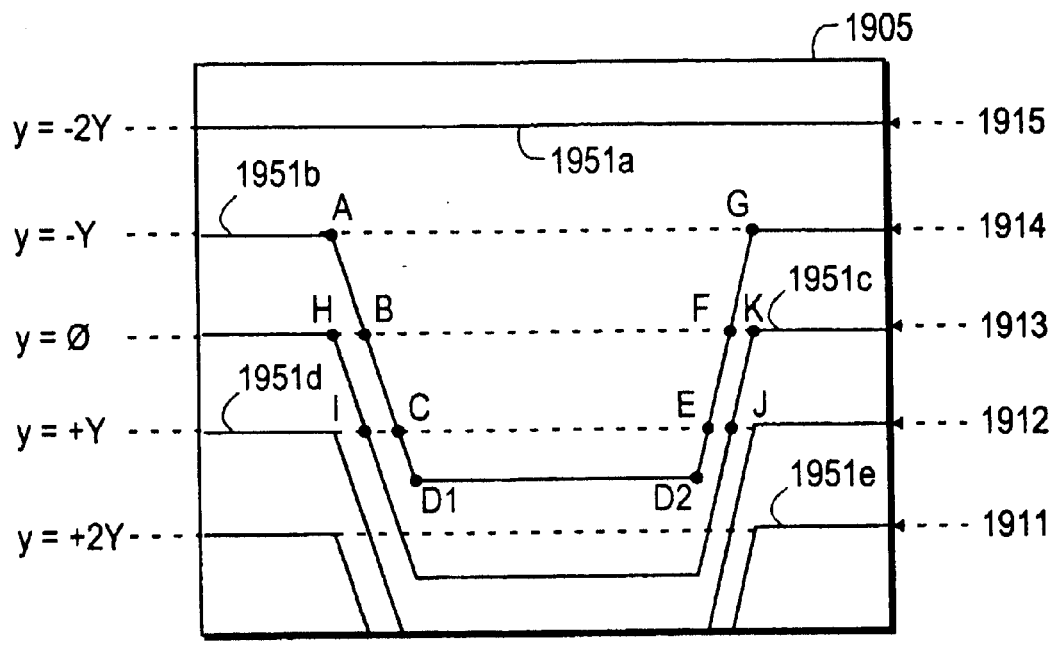
FIG. 19a shows an exemplary depiction of fringe line disturbances that expand outside their associated reference field.

By contrast, however, should it be desirable to readily measure fringe line disturbances that breach their respective reference fields, more robust signal processing techniques may be used to accurately "track" a particular fringe line. That is, for example, if memory resources are again partitioned so as to organize the storing of data according to the image's reference fields, the pixel locations of different fringe lines may reside within a common reference field. FIG. 19a shows an exemplary depiction of a fringe lines 1951b, 1951c, 1951d observed on a detector 1905 that breach their corresponding reference fields. Correspondingly, note that segments BC, EF of fringe line 1951b and segments HI, JK of fringe line 1951c reside within the same field of reference field (that is located between undisturbed fringe line locations 1913 and 1912).

Figure 19B:
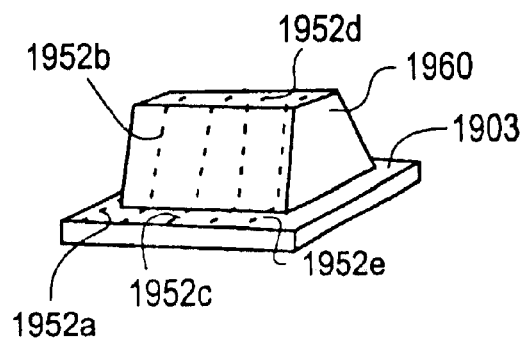

FIG. 19b shows an exemplary depiction of a sample 1960 that could cause the fringe line disturbances observed in FIG. 19a. Here, note that fringe lines 1951a, 1951b, 1951c, 1951d, 1951e of FIG. 19a respectively map to tracings 1952a, 1952b, 1952c, 1952d, 1951e of FIG. 19b. Comparing sample 1960 of FIG. 19b to sample 460 of FIG. 4b, note that the taller sample 1960 of FIG. 19b (as compared to the shorter sample 460 of FIG. 4b) may have caused fringe lines 1951b, 1951c, 1951d to breach their respective reference fields.

7.1 Memory Partitioning on a Reference Field-by-Reference Field Basis

Before commencing a discussion of more sophisticated signal processing techniques suitable for tracking multiple fringe lines within the same reference field, a brief discussion as to how memory resources used to store the pixel data of detected fringe line disturbances (e.g., such as memory 1023, 1523 of FIGS. 10 and 15, respectively) can be partitioned so as to store pixel data on a reference field by reference field basis. It is important to emphasize at the onset of this discussion that memory partitioning on a reference field by reference basis can be undertaken regardless if fringe lines "are" or "are not" expected to breach their respective reference fields. As such, memory partitioning can be applied to the signal processing techniques previously discussed with respect to FIGS. 13 through 15 as well as those environments where the fringe lines breach their respective reference fields as observed in FIG. 19a.

Analyzing stored image data on a reference field by reference field basis allows for easy/efficient memory management. That is, the memory resources used to store the disturbed image data (e.g., memory resource 1023 of FIG. 10a) can be viewed as being partitioned into the reference field sections themselves. This, in turn, allows for easy memory organization/usage regardless of where fringe lines are detected on the detector from measurement to measurement and sample to sample.

For example, according to one embodiment, the storage of the reference scale information includes the storage (e.g., into memory resource 1024 of FIG. 10a) of each z axis location on the detector where an undisturbed fringe line resides. As such, a first pre-established memory location can be reserved for the storage of the z axis location (e.g., "$z_1$") for a first undisturbed fringe line (e.g., fringe line 1205 of FIG. 12a), a second pre-established memory or register region can be reserved for the storage of the z axis location (e.g., "$z_2$") for a second undisturbed fringe line (e.g., fringe line 1204 of FIG. 12a), etc.

As such, the borders of the reference fields (i.e., the locations of neighboring, undisturbed fringe lines) are always stored in previously defined memory/register locations—regardless if the borders themselves change from reference scale to reference scale. That is, for example, the first reference field can always be recognized as being bounded by the z axis values $z_1$ and $z_2$ that have been stored between the first and second pre-established memory locations of memory 1024—even if the test equipment stores different measurement scale embodiments (e.g., different fringe line spacings) over the course of its useful life.

As a consequence, the pixel locations of the detected fringe line disturbances can be easily "binned" according to their particular reference field. Better said, with knowledge of the reference field borders, the fringe detection unit 1006 can store fringe line sections within the same reference field region into a common region of memory 1023 (e.g., referring to FIG. 19*a*, the pixel coordinates of fringe line sections HI, BC, EF and JK can be stored into a common memory location of memory 1023). Furthermore, these regions of memory 1023 can be pre-established as well (e.g., a first pre-established region of memory 1023 is reserved for pixel values detected within a first reference field—regardless of the z axis borders for the first reference field; a second pre-established region of memory 1023 is reserved for pixel values detected within a second reference field—regardless of the z axis borders for the first reference field;, etc.).

Furthermore, the topography measurement unit 1007 can be configured to automatically read from these pre-established regions of memory 1023 in order to purposely extract data within a certain reference field and without knowledge of the specific z axis borders themselves. For example, the topography measurement unit 1007 may be pre-configured to: 1) read from a first address (or group of addresses) to obtain the pixel locations of detected fringe lines within a "first" reference field; 2) read from a second address (or group of addresses) to obtain the pixel locations of detected fringe lines within a "second" reference field;, etc, As such, access to the specific z axis border values are not needed by the topography measurement unit according to this perspective.

7.2 Tracking Multiple Fringe Lines within the Same Reference Field

As mentioned previously, memory resources may be partitioned on a reference field by reference basis regardless as to whether or not fringe lines are expected to breach their corresponding reference fields. For example, referring to FIGS. 13 and 12*a*: 1) the pixel locations of fringe lines 1205 and 1305 may be read from memories 1024, 1023 as a consequence of reading the undisturbed and disturbed data for a first reference field (these may then be subtracted from one another to form topography profile 1405); 2) the pixel locations of fringe lines 1204 and 1304 may be read from memories 1024, 1023 as a consequence of reading the undisturbed and disturbed data for a second reference field (these may then be subtracted from one another to form topography profile 1404);, etc.

However, if fringe line disturbances are expected to breach their corresponding reference fields, more sophisticated signal processing techniques may be necessary. Better said, once fringe line disturbances are allowed to breach their reference fields, different fringe lines may occupy the same reference space. As such, a technique should be used where different fringe lines can be recognized within the same reference field space so that their respective disturbance(s) can be correctly measured. For example, fringe line segment BC of FIG. 19*a* represents a greater height above the sample stage that does fringe line segment HI. As such, the different fringe lines should be recognized so that their corresponding, undisturbed positions can be used a reference for measuring topography.

Figure 20:
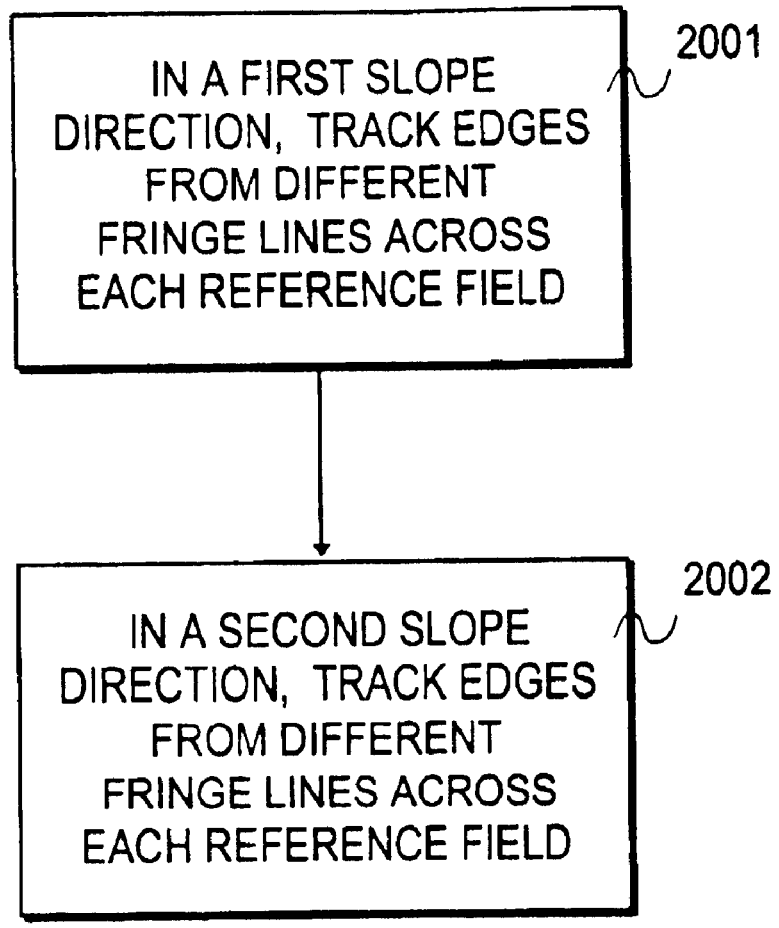
FIG. 20 shows a methodology that may be used to follow a fringe line that is disturbed beyond its associated reference field.

FIG. 20 shows a signal processing technique that emphasizes the tracking of the individual slopes (i.e., "edges") of a fringe line disturbances in order to deal with the presence of different fringe lines within a common reference field. Furthermore, while a particular fringe line disturbance edge is being tracked, calculations are made to translate each fringe line disturbance position into its corresponding sample height ($z_s$). With knowledge of the specific locations in xy sample stage space, the signal processing technique is able to produce an "output" that corresponds to specific x, y, $z_s$ data positions. These x,y $z_s$ data positions can then be stored or plotted to display the overall topography of the sample. Furthermore, as described in more detail below, the technique allows for further compression of the pixel data points to further reduce processing overhead.

According to the signal processing technique of FIG. 20, track edges from different fringe lines are tracked 2001 across each reference field in a first direction (e.g., in a "downward" sloped direction as observed in FIG. 19*a*). For example, in order to execute the first tracking sequence 2001, the technique may: 1) read from a memory the image data corresponding to the reference field between undisturbed fringe line locations 1914 and 1913; and, track the downward edge segment "AB" of fringe line 1951*b*; then, 2) read from a memory the image data corresponding to the reference field between undisturbed fringe line locations 1913 and 1912 and track the downward edge segments "BC" of fringe line 1951*b* and "HI" of fringe line 1951*c*;, etc. Eventually the reference field beneath undisturbed fringe line location 1911 will be processed signifying the end of sequence 2001.

Then, in over the course of executing the second tracking sequence 2001 in an "upward" direction, the technique may (after the reference fields beneath location 1911 and between locations 1911 and 1912 have already been processed): 1) read from a memory the image data corresponding to the reference field between undisturbed fringe line locations 1913 and 1912 and track the upward edge segments "EF" of fringe line 1951*b* and "JK" of fringe line 1951*c*; then, 2) read from a memory the image data corresponding to the reference field between undisturbed fringe line locations 1914 and 1913; and, track the upward edge segment "FG" of fringe line 1951*b*;, etc. Eventually the reference field between fringe line locations 1915 and 1914 will be processed signifying the end of sequence 2002.

FIGS. 21*a* through 21*c* are directed to an embodiment of a methodology that may be used to process data in either the upward or downward direction. FIG. 21*a* shows the methodology, FIG. 21*b* relates to its application in the "downward" direction, and, FIG. 21*c* relates to its application in the "upward" direction. An example of operation in each direction will be subsequently discussed. Referring to FIGS. 21*a* and 21*b*, a reference field worth of data is read 2101 from its corresponding memory location. Here, the reference field worth of data may be retrieved 2101 with an address location (or group of address locations) where the pixel locations for detected fringe lines that reside within the reference field in question are found within the memory.

Then, starting at its intercept with the upper border of the reference field, each fringe line segment is "tracked" (e.g., by recognizing the existence of proximate pixel locations) while translating it into sample height $z_s$ at the proper xy sample stage positions 2102. The tracking and translating 2102 can be viewed as multidimensional 2102$_1$ through $2012_n$ where the dimension size depends on the number of different fringe line segments that are to be processed. That is, if one segment requires processing in the downward direction (e.g., as is the case with respect to the reference field between positions 1914 and 1913) n=1; if two segments require processing in the downward direction (e.g., as is the case with respect to the reference field between positions 1913 and 1912) n=2;, etc.

A fringe line segment may be tracked in the downward direction by starting at its intercept with its "upper" border and searching for or otherwise recognizing the existence of (within the reference field data) a proximately located pixel coordinate (e.g., by scanning the data and seizing the closest pixel location that is "down and/or to the right" of the intercept—in simple cases this should correspond to just selecting the pixel location having the next highest x value). The process is then continually repeated until the intercept point with the next lower reference field is reached; or, the fringe line doubles back and recrosses the upper border.

Each pixel location of a fringe line segment may be translated into its appropriate x, y, $z_s$ sample topography information through the use of the stored measurement scale information and an understanding of the overall geometry and optics. In an embodiment, consistent with the illustrations provided herein, for any fringe line pixel location (x,z): 1) the appropriate sample stage x coordinate value is determined by factoring the x coordinate of the pixel by a "per pixel resolution in the x and y direction" parameter (e.g., such as that discussed toward the end of section 3.1); 2) the appropriate sample stage y coordinate value is determined by reference to the particular fringe line being tracked (e.g., fringe line 1951*b* is understood to be y axis location −Y on the sample stage) and, 3) the appropriate sample height $z_s$ is determined according to the relationship $$z_s = REF2 + (R - dz)$$

where: a) REF2 is a "baseline reference" that takes into account how many reference fields the fringe line has already breached; b) R is the "sample height per reference field breach"; and c) dz is the difference between the pixel's z axis detector location and the location of the lower reference field border REF1 (i.e., z-REF1) factored by a per pixel unit of sample height parameter. A more thorough discussion of each of these follows below.

REF2 can be viewed as a variable that is kept track of for each fringe line. That is, in various embodiments, a separate REF2 variable is maintained for each fringe line being tracked. Each time a fringe line breaches another reference field, its corresponding REF2 variable is incremented by N(Δz) where N is the number of pixels (along the z axis of the detector) between neighboring fringe lines and Δz is the per pixel unit of sample height (e.g., as discussed in section 3.2). As such, when a fringe line is within its field of reference (such as fringe line 1951*b* segment AB) the REF2 variable is 0 has not yet breached its field of reference.

When a fringe line breaches its first field of reference and needs to be tracked across a second field of reference (such as fringe line 1951*b* segment BC), the fringe line's REF2 variable will be incremented to a value of N(Δz) for the translation process that occurs in the fringe line's second field of reference. Similarly, should the fringe line breach into a third field of reference, the fringe line's REF2 variable will be incremented to a value of 2N(Δz) for the translation process that occurs in the third field of reference, etc. As such, the REF2 variable for a fringe line converts each field of reference breach into a corresponding sample height distance.

Whereas the REF2 variable represents the amount of sample height that has been measured "so far" for a particular fringe line, R (the "sample height per reference field breach") represents the field of sample height locations that are implicated by the tracking of the fringe line within the field of reference that is currently being processed. As such, R is a fixed value of N(Δz). Here, for any detector z axis location, the term R-dz effectively represents, how far into the current reference field the fringe line has extended. That is, as dz represents the per pixel unit of sample height Δz factored by the distance above REF1 (referring to FIG. 21*b*) that a particular pixel location corresponds to, when dz is 0, the fringe line has completed expanded the reference field so as to intercept the next lower field of reference (e.g., point B in FIGS. 21*b* and 19*a*); and, when dz is R/2 the fringe line has breached halfway into the current reference field, etc.

When the "downward" sloped fringe lines have been tracked in a reference field, the looping nature of the methodology of FIG. 21*a* indicates that the data for a next lower reference field will be extracted and analyzed. For example, after the reference field between locations 1914 and 1913 is analyzed (so as to track segment AB of fringe line 1951*b*), the reference field between locations 1913 and 1912 will be analyzed next (so as to track segments BC of fringe line 1951*b* and HI of fringe line 1951*c*), etc. Here, in between a pair of reference field analysis', the intercept point of each fringe line is identified/recorded 2103 for each fringe line that has breached into a next lower reference field (e.g., points C and I after the reference field between locations 1913 and 1912 is analyzed).

For those fringe lines that do not breach into the next field of reference some form of data compression may be undertaken. For example, in the case of fringe line 1951*b* when the reference field between locations 1912 and 1911 is being analyzed, the data tracking process may be terminated at point D1 such that only the edges of the sample are actually measured. Alternatively, the tracking process may be slowed down from point D1 to point D2 so that the density of translated sample points is reduced when running across a flat plane of the sample. Either of these techniques reduces the number of pixel locations used for topography information; which, in turn, corresponds to a form of data compression.

After the downward sloped fringe line edges are tracked, a similar process is repeated but in the opposite, upward direction. Here, the methodology of FIG. 21*a* may again be referred to. FIG. 21*c* relates to the processing of the fringe line segment EF of fringe line 1951*b* (when the reference field between locations 1913 and 1912 is analyzed). Here, the processing in the upward direction is similar to that of the downward direction.

The most significant difference is that, in one embodiment, the appropriate sample height $z_s$ is determined according to the relationship $$z_s = REF2 - dz$$

where REF2 is the same "baseline reference" that takes into account how many reference fields the fringe line has already breached—but, in the upward direction it is decremented (rather than incremented) by N(Δz) each time a higher reference field is analyzed. Note that the lower border for purposes of determining dz in this case is REF2. Once all the fringe lines have been tracked and the tracking process reaches the highest field of reference, a collection of (x,y,$z_s$) data points are left remaining that describe the topography of the sample in three dimensions. Those of ordinary skill will be able to develop topography measurement unit 1007 software and/or hardware that can perform the techniques described just above.

8.0 Closing Statement

In the foregoing specification, the inventions have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
    tracking a fringe line disturbance that has breached its field of reference on a reference field by reference field basis by:
        reading image data for a first reference field, said image data comprising pixel locations of one or more detected fringe lines within said first reference field, said fringe line disturbance's fringe line being one of said one or more detected fringe lines;
        starting at a pixel location that corresponds to an intercept of said fringe line with a border of said first reference field, following each pixel location of said fringe line in a direction away from said border;
        reading image data for a second reference field, said image data for said second reference field comprising pixel locations of one or more detected fringe lines within said second reference field, said fringe line being one of said one or more detected fringe lines within said second reference field, said second reference field adjacent to said first reference field;
        starting at a pixel location that corresponds to an intercept of said fringe line with a border of said second reference field, following each pixel location of said fringe line in a direction away from said border of said second reference field;
    translating each pixel location of said tracked fringe line disturbance being followed to an x,y,$z_s$ data point, where x and y represent a position on the plane of an interferometer's sample stage, and where $z_s$ represents the height of a sample above said x,y position, said sample placed upon the sample stage of an inteferometer so as to create said fringe line disturbance, said fringe line disturbance observed on said interferometer's detector.

2. The method of claim 1 wherein both of said borders are upper borders when projected onto said detector and both of said directions are downward directions when projected onto said detector.

3. The method of claim 1 wherein said translating for a particular pixel further comprises calculating $z_s$ according to:

$$z_s = REF2 + (R - dz)$$

where:
   a) REF2 is a baseline reference that takes into account how many reference fields said fringe line has already breached;
   b) R is a parameter that indicates the amount of sample height per reference field breach; and
   c) dz is the difference between said pixel's z axis location on said detector and the location of the lower border of said reference field factored by a per pixel unit of sample height parameter.

4. The method of claim 3 further comprising incrementing said REF2 parameter by R each time said fringe line disturbance breaches into another reference field.

5. The method of claim 4 wherein R=N($\Delta z$) where N is the number of pixel locations between neighboring fringe lines observed on said detector and $\Delta z$ is said per pixel unit of sample height parameter.

6. The method of claim 1 wherein both of said borders are lower borders when projected onto said detector and both of said directions are upward directions when projected onto said detector.

7. The method of claim 6 wherein said translating for a particular pixel further comprises calculating $z_s$ according to:

$$z_s = REF2 - dz$$

where:
   a) REF2 is a baseline reference that takes into account how many reference fields said fringe line has already breached; and
   b) dz is the difference between said pixel's z axis location on said detector and the location of the lower border of said reference field factored by a per pixel unit of sample height parameter.

8. The method of claim 7 further comprising decrementing said REF2 parameter by R each time said fringe line disturbance rises into another reference field.

9. The method of claim 8 wherein R=N($\Delta z$) where N is the number of pixel locations between neighboring fringe lines observed on said detector and $\Delta z$ is said per pixel unit of sample height parameter.

10. A machine readable medium comprising instructions which when executed by a processor cause said processor to perform a method, comprising:
    tracking a fringe line disturbance that has breached its field of reference on a reference field by reference field basis by:
        reading image data for a first reference field, said image data comprising pixel locations of one or more detected fringe lines within said first reference field, said fringe line disturbance's fringe line being one of said one or more detected fringe lines;
        starting at a pixel location that corresponds to an intercept of said fringe line with a border of said first reference field, following each pixel location of said fringe line in a direction away from said border;
        reading image data for a second reference field, said image data for said second reference field comprising pixel locations of one or more detected fringe lines within said second reference field, said fringe line being one of said one or more detected fringe lines within said second reference field, said second reference field adjacent to said first reference field;
        starting at a pixel location that corresponds to an intercept of said fringe line with a border of said second reference field, following each pixel location of said fringe line in a direction away from said border of said second reference field;
    translating each pixel location of said tracked fringe line disturbance being followed to an x,y,$z_s$ data point, where x and y represent a position on the plane of an interferometer's sample stage, and where $z_s$ represents the height of a sample above said x,y position, said sample placed upon the sample stage of an inteferometer so as to create said fringe line disturbance, said fringe line disturbance observed on said interferometer's detector.

11. The method of claim 10 wherein both of said borders are upper borders when projected onto said detector and both of said directions are downward directions when projected onto said detector.

12. The method of claim 10 wherein said translating for a particular pixel further comprises calculating $z_s$ according to:

$$z_s = REF2 + (R - dz)$$

where:
a) REF2 is a baseline reference that takes into account how many reference fields said fringe line has already breached;
b) R is a parameter that indicates the amount of sample height per reference field breach; and
c) dz is the difference between said pixel's z axis location on said detector and the location of the lower border of said reference field factored by a per pixel unit of sample height parameter.

13. The method of claim 12 further comprising incrementing said REF2 parameter by R each time said fringe line disturbance breaches into another reference field.

14. The method of claim 13 wherein $R = N(\Delta z)$ where N is the number of pixel locations between neighboring fringe lines observed on said detector and $\Delta z$ is said per pixel unit of sample height parameter.

15. The method of claim 10 wherein both of said borders are lower borders when projected onto said detector and both of said directions are upward directions when projected onto said detector.

16. The method of claim 15 wherein said translating for a particular pixel further comprises calculating $z_s$ according to:

$$z_s = REF2 - dz$$

where:
a) REF2 is a baseline reference that takes into account how many reference fields said fringe line has already breached; and
b) dz is the difference between said pixel's z axis location on said detector and the location of the lower border of said reference field factored by a per pixel unit of sample height parameter.

17. The method of claim 16 further comprising decrementing said REF2 parameter by R each time said fringe line disturbance rises into another reference field.

18. The method of claim 17 wherein $R = N(\Delta z)$ where N is the number of pixel locations between neighboring fringe lines observed on said detector and $\Delta z$ is said per pixel unit of sample height parameter.

* * * * *